United States Patent
Hah et al.

(10) Patent No.: US 12,277,495 B1
(45) Date of Patent: Apr. 15, 2025

(54) HYPER-RECTANGLE NETWORK FOR GRADIENT EXCHANGE

(71) Applicant: Amazon Technologies, Inc., Seattle, WA (US)

(72) Inventors: Thiam Khean Hah, San Jose, CA (US); Yongseok Koh, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 967 days.

(21) Appl. No.: 17/301,320

(22) Filed: Mar. 31, 2021

(51) Int. Cl.
*G06N 3/08* (2023.01)
*G06N 3/045* (2023.01)

(52) U.S. Cl.
CPC .............. *G06N 3/08* (2013.01); *G06N 3/045* (2023.01)

(58) Field of Classification Search
CPC ............ G06N 3/08; G06N 3/045; G06N 3/04; G06N 3/06
See application file for complete search history.

(56) References Cited

U.S. PATENT DOCUMENTS

| | | |
|---|---|---|
| 6,243,863 B1 | 6/2001 | Kothari et al. |
| 2004/0136613 A1 | 7/2004 | Menger |
| 2014/0229633 A1* | 8/2014 | Bent ............ H04L 61/50 709/245 |
| 2018/0082181 A1 | 3/2018 | Brothers et al. |
| 2019/0138302 A1 | 5/2019 | Kasagi |
| 2019/0245843 A1 | 8/2019 | Ja et al. |
| 2020/0311017 A1* | 10/2020 | Knowles ........... G06F 15/17318 |
| 2020/0320022 A1 | 10/2020 | Hua |
| 2021/0240532 A1* | 8/2021 | Han ..................... G06F 9/505 |
| 2021/0311808 A1* | 10/2021 | Cevolani ............. G06F 9/522 |
| 2021/0349847 A1* | 11/2021 | Knowles ............. G06F 15/173 |
| 2022/0076138 A1* | 3/2022 | Kohita ................ G06N 5/01 |

(Continued)

FOREIGN PATENT DOCUMENTS

CN 113452655 A 9/2021

OTHER PUBLICATIONS

Dowling, Jim, [Webpage] "Distributed TensorFlow", O'Reilly Media, Inc., Dec. 19, 2017, pp. 1-17 <URL:https://www.oreilly.com/content/distributed-tensorflow/>, [retrieved on Apr. 7, 2021].

(Continued)

*Primary Examiner* — Dave Misir
(74) *Attorney, Agent, or Firm* — Weaver Austin Villeneuve & Sampson LLP

(57) ABSTRACT

Systems and methods are disclosed to perform gradient exchange among processing nodes configured as a hyper-rectangle network of N-dimensions. Each processing node can operate as a collective parameter server node capable to perform collective compute operations. For each dimension in a sequence of dimensions, all processing nodes on a same edge can perform a scatter-reduce operation using respective collective parameter serving engines. The amount of data reduced in each dimension is an inverse of a number of processing nodes in that dimension. After the scatter-reduce operation is performed for all the dimensions, all processing nodes on the same edge can perform an all-gather operation for each dimension in a reverse sequence of dimensions.

19 Claims, 23 Drawing Sheets

(56) References Cited

U.S. PATENT DOCUMENTS

2022/0121928 A1 4/2022 Dong et al.
2022/0131699 A1 4/2022 Kimmel et al.

OTHER PUBLICATIONS

Goyal, Priya, et al., "Accurate, Large Minibatch SGD: Training ImageNet in 1 Hour", Apr. 30, 2018 (version 2), pp. 1-12 <URL:https://arxiv.org/abs/1706.02677v2> [retrieved on Apr. 7, 2021].

Ishii, Alex, et al., "NVSwitch and DGX-2 NVLink-Switching Chip and Scale-Up Compute Server", NVIDIA Corporation, 2018, 30 pages <URL:https://old.hotchips.org/hc30/2conf/2.01_Nvidia_NVswitch_HotChips2018_DGX2NVS_Final.pdf> [retrieved on Apr. 7, 2021].

Jeaugey, Sylvain, [*Webpage*] "Massively Scale Your Deep Learning Training with NCCL 2.4", NVIDIA Developer (blog), Feb. 4, 2019, pp. 1-4 <URL:https://developer.nvidia.com/blog/massively-scale-deep-learning-training-nccl-2-4/> [retrieved on Apr. 7, 2021].

Jeaugey, Sylvain, "Multi-GPU Training with NCCL", NVIDIA Corporation, 2018, 19 pages <URL:https://on-demand.gputechconf.com/gtc/2018/presentation/s8462-multi-gpu-training-with-nccl.pdf> [retrieved on Apr. 1, 2021].

Jeaugey, Sylvain, "NCCL 2.0", NVIDIA Corporation, 2017, 28 pages <URL:https://on-demand.gputechconf.com/gtc/2017/presentation/s7155-jeaugey-nccl.pdf> [retrieved on Apr. 1, 2021].

Jeaugey, Sylvain, [*Webpage*] "Scaling Deep Learning Training with NCCL", NVIDIA Developer (blog), Sep. 26, 2018, pp. 1-4 <URL:https://developer.nvidia.com/blog/scaling-deep-learning-training-nccl> [retrieved on Apr. 7, 2021].

Jia, Xianyan, et al., "Highly Scalable Deep Learning Training System with Mixed-Precision: Training ImageNet in Four Minutes", Jul. 30, 2018, pp. 1-9 <URL: https://arxiv.org/abs/1807.11205v1> [retrieved on Apr. 1, 2021].

Mikami, Hiroaki, et al., "Massively Distributed SGD: ImageNet/ResNet-50 Training in a Flash", Sony Corporation, Mar. 5, 2019 (version 2), pp. 1-7 <URL: https://arxiv.org/1811.05233v2> [retrieved on Apr. 7, 2021].

Sanders, Peter, et al., "Two-Tree Algorithms for Full Bandwidth Broadcast, Reduction and Scan", Parallel Computing, vol. 35, Issue 12, 2009, pp. 581-594 <URL: https://doi.org/10.1016/j.parco_2009.09.001> and <URL:http://citeseerx.ist.psu.edu/viewdoc/download?doi=10.1.1.505.2136&rep=rep1&type=pdf > [retrieved on Apr. 1, 2021, 23 pages].

Woolley, Cliff, "NCCL: Accelerated Multi-GPU Collective Communications", NVIDIA Corporation, 2015, 56 pages. <URL:https://images.nvidia.com/events/sc15/pdfs/NCCL-Woolley.pdf> [retrieved on Apr. 1, 2021].

Ying, Chris, et al., "Image Classification at Supercomputer Scale", Dec. 2, 2018 (version 2), pp. 1-8 <URL: https://arxiv.org/abs/1811.06992v2> [retrieved on Apr. 1, 2021].

U.S. Appl. No. 17/301,325, filed Mar. 31, 2021, Thiam Khean Hah.

Chavarría-Miranda, D., et al., "Topology-aware Tile Mapping for Clusters of SMPs," CF'06: Proc. of the $3^{rd}$ Conference on Computing Frontiers, May 2006, pp. 383-391.

Crandall, P. E., "Data Decomposition and Load Balancing for Networked Data-Parallel Processing," Thesis for Ph.D. submitted to Oregon State University, Apr. 19, 1994, pp. 1-127.

Darte, A., et al., "Generalized Multipartitioning of Multi-Dimensional Arrays for Parallelizing Line-Sweep Computations," Preprint submitted to *Journal of Parallel and Distributed Computing*, Feb. 25, 2003, pp. 1-39.

Kwerner, "Choosing an Appropriate Number of Processors," WRF & MPAS—A Support Forum, Mar. 7, 2019, (last edited Apr. 17, 2023), 2 pages, URL: https://forum.mmm.ucar.edu/threads/choosing-an-appropriate-numer-of-processors.5082/.

U.S. Non-Final Office Action dated May 8, 2024 in U.S. Appl. No. 17/301,325.

U.S. Final Office Action dated Nov. 12, 2024 in U.S. Appl. No. 17/301,325.

\* cited by examiner

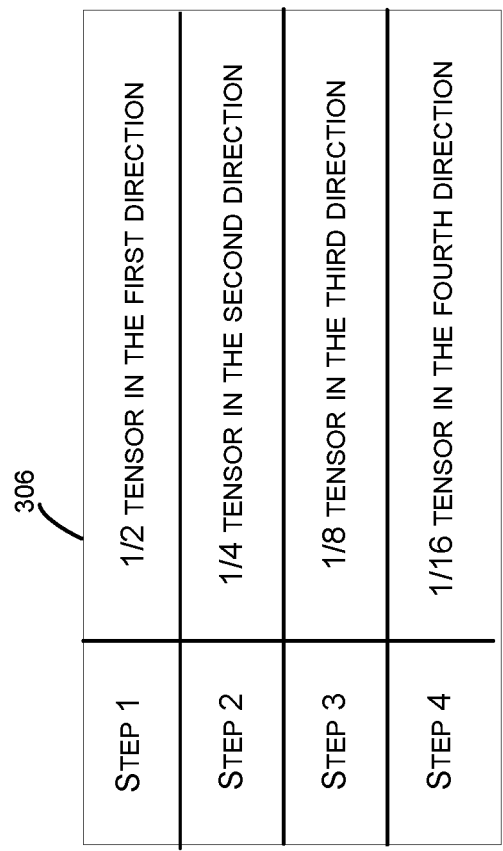
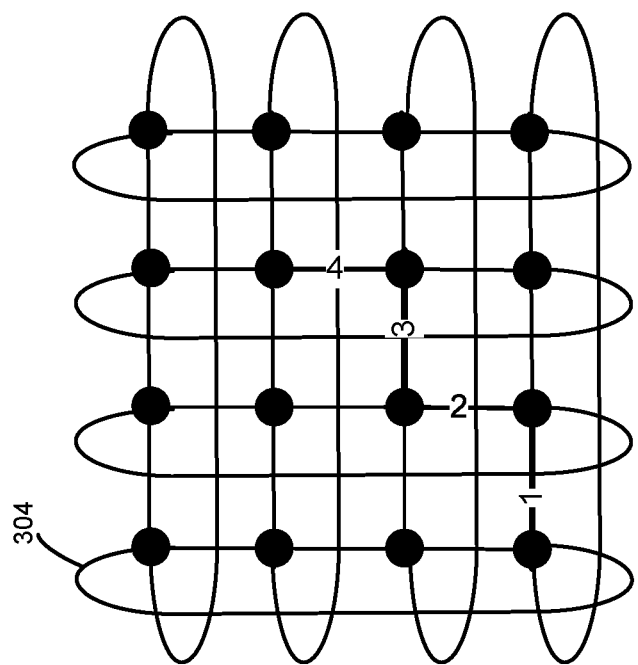
FIG. 3B

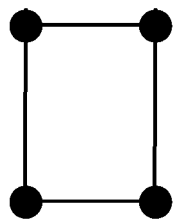
FIG. 4C
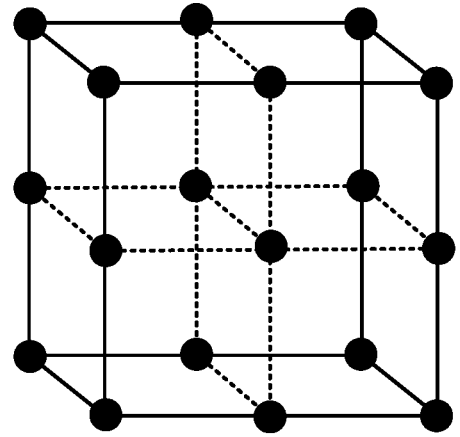
FIG. 4E
FIG. 4B
FIG. 4A
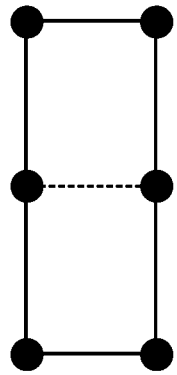
FIG. 4D

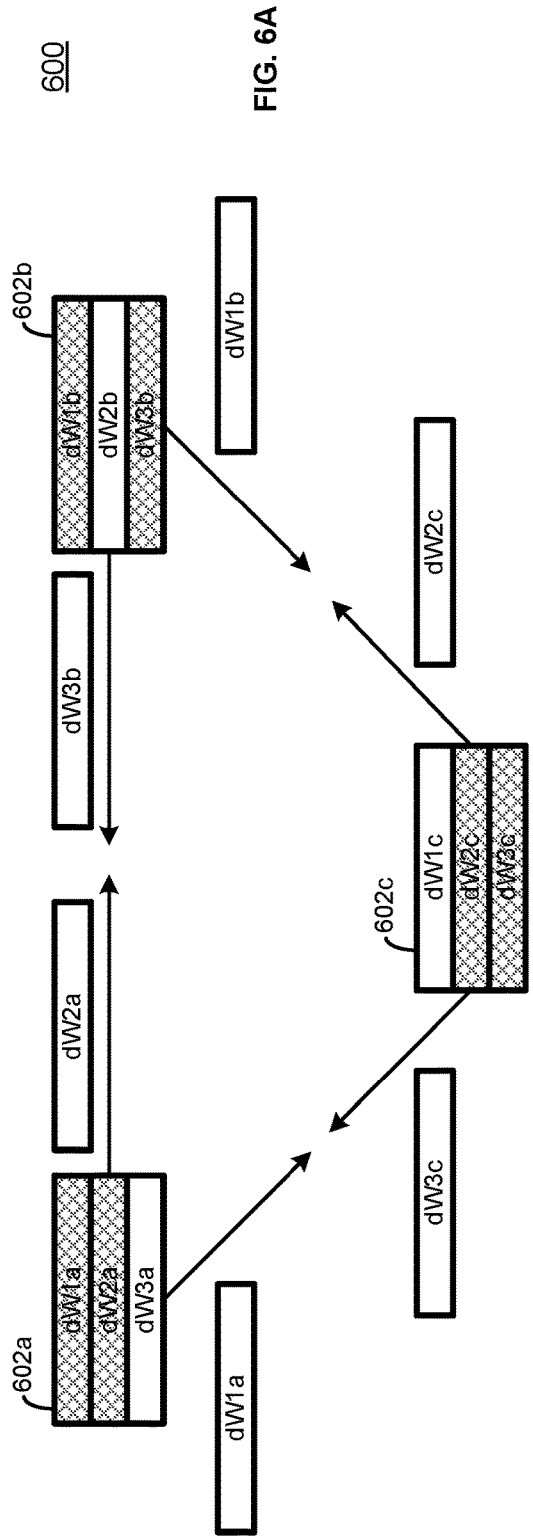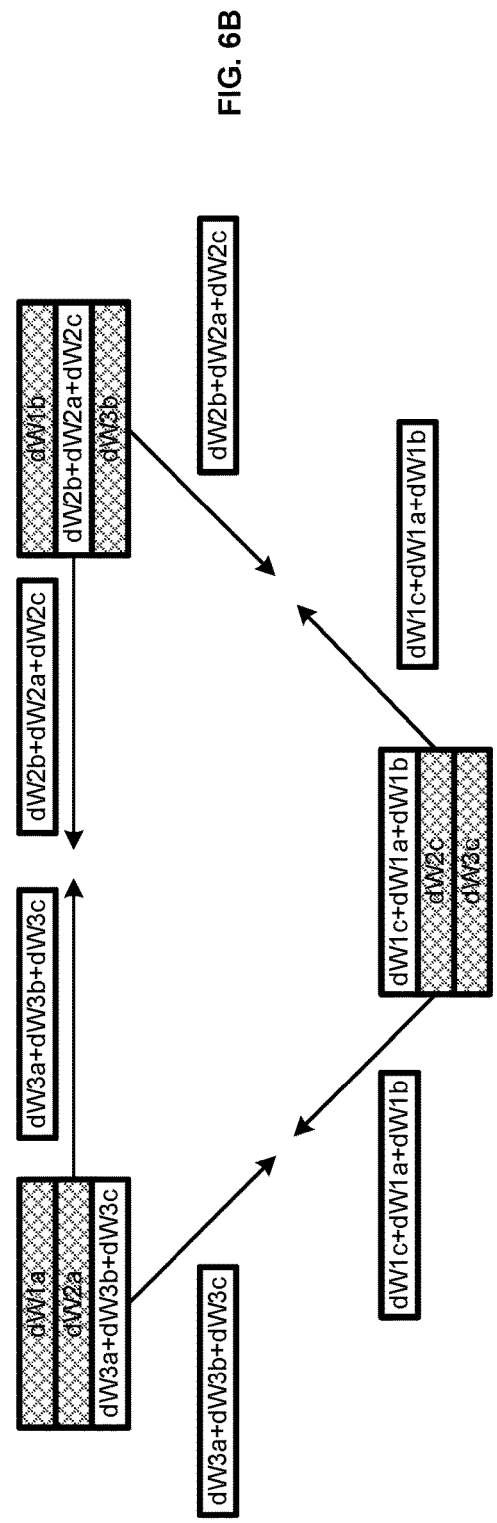

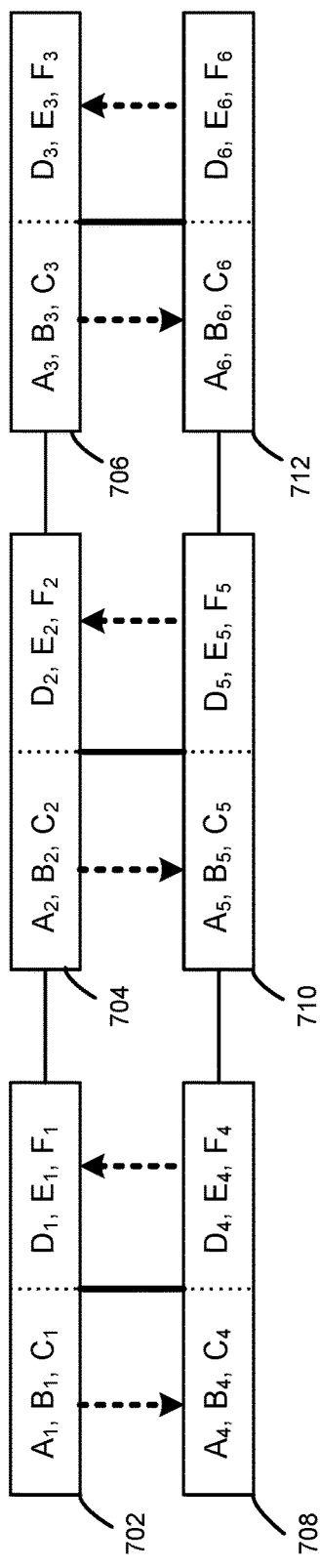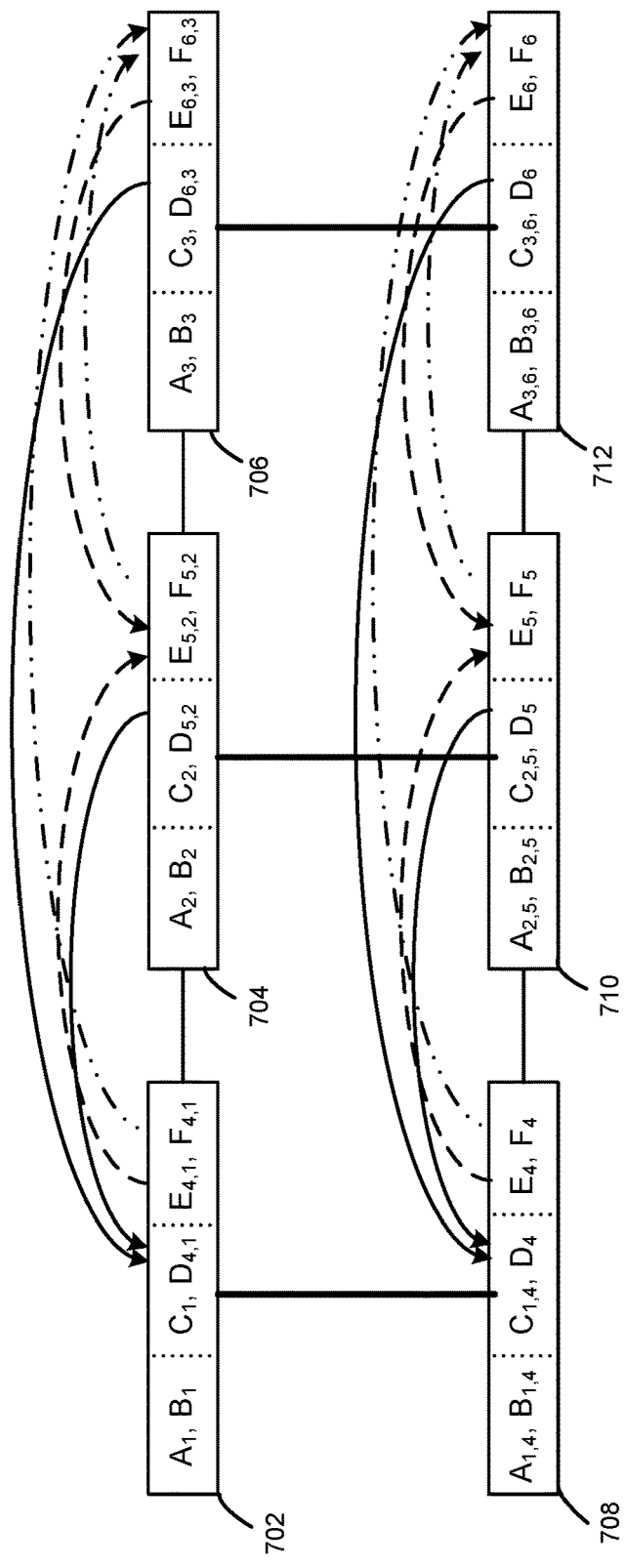

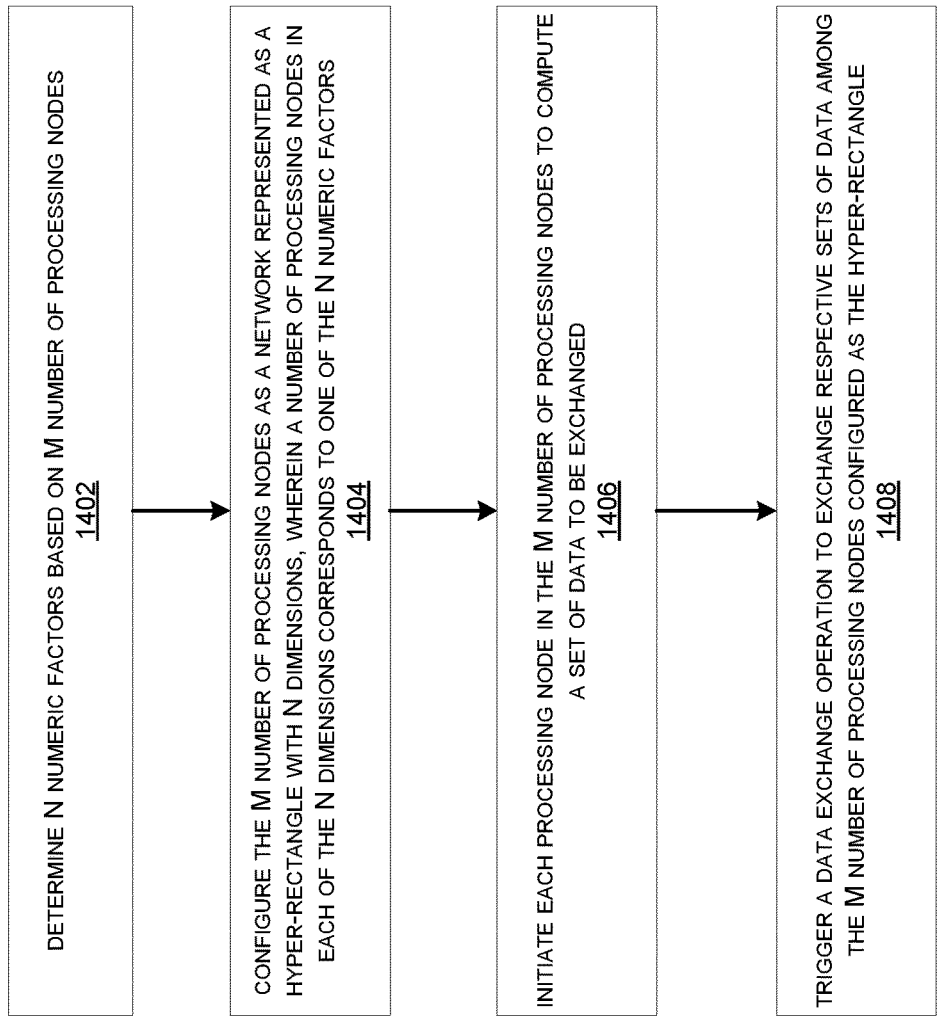

1500

PERFORM, BY A PROCESSING NODE OF A SYSTEM OF PROCESSING NODES, A FIRST PASS OF A TRAINING PROCESS OF A NEURAL NETWORK TO COMPUTE A SET OF WEIGHT GRADIENTS
1502

↓

FOR EACH OF THE N-DIMENSIONS THAT THE PROCESSING NODE IS PART OF, PERFORM ACCORDING TO A SEQUENCE OF DIMENSIONS, A SCATTER-REDUCE OPERATION ON THE SET OF WEIGHT GRADIENTS WITH PROCESSING NODES THAT ARE ON A SAME EDGE OF A CORRESPONDING DIMENSION TO GENERATE REDUCED WEIGHT GRADIENTS
1504

↓

FOR EACH OF THE N-DIMENSIONS THAT THE PROCESSING NODE IS PART OF, PERFORM IN A REVERSE ORDER OF A SEQUENCE OF DIMENSIONS, AN ALL-GATHER OPERATION ON THE REDUCED WEIGHT GRADIENTS WITH THE PROCESSING NODES THAT ARE ON THE SAME EDGE OF THE CORRESPONDING DIMENSION TO GENERATE UPDATED WEIGHT GRADIENTS
1506

FIG. 15

HYPER-RECTANGLE NETWORK FOR GRADIENT EXCHANGE

BACKGROUND

Neural networks can be used to perform tasks such as recognizing an object in an image. In a neural network, input data is combined with weights to derive output data using activation functions. For example, a neural network may take an image as input data, and output a decision or likelihood that a certain object is in the image. The set of weights used in a neural network can be determined by a training process, in which the neural network can learn how to perform a certain computing task for an application. The training process involves supplying a neural network model with training input data and a corresponding reference output which supports a particular decision (e.g., a detection or a non-detection of an object in an image). The neural network can perform computations to combine the weights with the training input data to generate training output data, and the training output data can be compared against the reference output data to assess the accuracy of the neural network model. During training, different training input data sets can be provided to generate different training output data sets. The weights of the neural network can be adjusted to minimize the differences between the training output data and the reference output data. To improve the likelihood of the neural network generating a correct decision, a large volume of training input data covering a large number of scenarios can be used to train the neural network. As a result, training a neural network may take a lot of time and computational resources.

BRIEF DESCRIPTION OF THE DRAWINGS

Various embodiments in accordance with the present disclosure will be described with reference to the drawings, in which:

FIGS. 3A-3B illustrate steps for gradient exchange for different dimensions of hypercubes;

FIGS. 4A-4E illustrate example hyper-rectangles for different numbers of processing nodes;

FIGS. 6A-6C illustrate a gradient exchange process based on the algorithm to exchange a set of weight gradients among 3 processing nodes configured as collective parameter server nodes;

FIGS. 7A-7F illustrate a gradient exchange process performed by a 2×3 hyper-rectangle based on the algorithm, according to certain embodiments;

FIG. 14 illustrates a flow chart illustrating an example of a method to configure a plurality of processing nodes as a network represented as a hyper-rectangle with N dimensions, according to certain embodiments;

FIG. 15 illustrates a flow chart for a computer-implemented method for distributed training in a system of processing nodes configured as a hyper-rectangle network of N-dimensions, according to certain embodiments.

DETAILED DESCRIPTION

Figure 1:
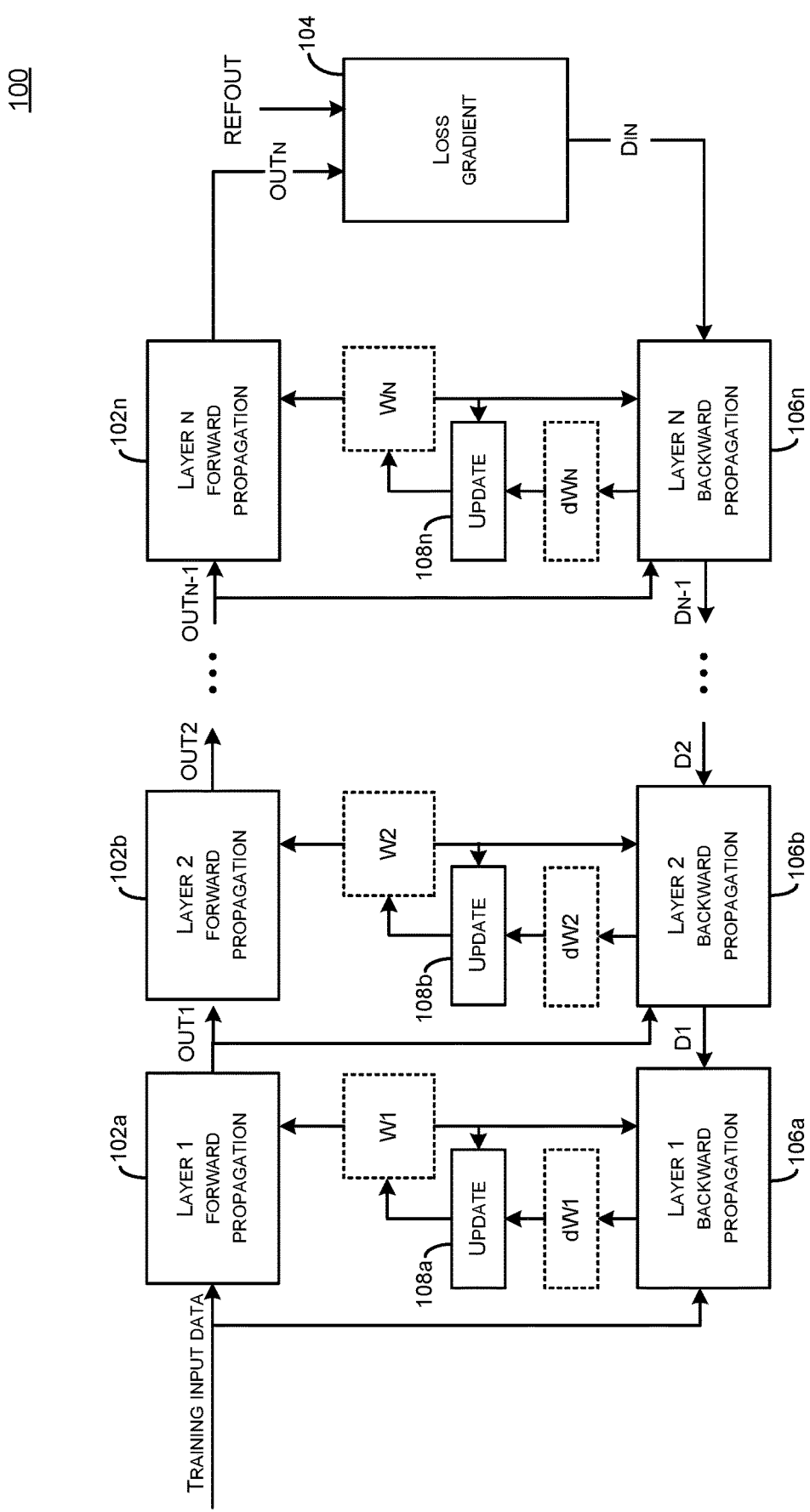
FIG. 1 illustrates an example of a training process to train a neural network.

A neural network typically includes a number of cascading neural network layers each associated with a set of weights. In an inference operation, a first neural network layer can receive an input data set, combine the input data set with the weights (e.g., by multiplying the input data set with the weights and then summing the products) to generate a first output data set for the layer, and to propagate the output data set to a second neural network layer in a forward propagation operation. The second neural network layer performs another set of forward propagation operations on the first output data set from the first layer to generate a second output data set, and to propagate the second output data set to higher neural network layers. The forward propagation operations can start at the first neural network layer and end at the highest neural network layer. The forward propagation operations at each neural network layer can represent different stages of extraction and processing of information from the input data set. A decision can then be made based on the output data of the highest neural network layer. For example, each neural network layer can extract and/or process features from an image, and a decision of whether an object is in the image can be generated based on the result of processing the extracted features at the neural network layers.

The set of weights of the neural network can be generated and/or updated by a training process to improve the likelihood of the neural network outputting a correct decision. An example training process can use a gradient descent scheme. As part of the training process, forward propagation operations can be performed on a training input data set using the set of weights at each neural network layer to generate a training output data set at the highest level neural network layer. The training output data set can be compared with a reference output data set to determine an error of the neural network model operating on the training input data, and this error can be used to adjust the weights of the model to improve the accuracy of the neural network.

As part of the training process, each neural network layer can perform backward propagation operations to adjust the set of weights at each neural network layer. During backward propagation, the error or the difference between the training output data set and the reference output data set is propagated backward from the highest neural network layer back towards the first neural network layer. At each layer, a set of weight gradients is calculated based on the error to determine the amount of adjustment to make to each weight value. One iteration of the training process is completed when the weights of each layer have been adjusted. The next iteration of the training process can then be performed with the updated weights, and the training process can be repeated for a number of iterations until a loss objective is achieved, such as minimizing the error or until the error lowers to a certain threshold.

The training process can be very time-consuming due to data dependency among the operations involved. As described above, forward propagation operations are first performed to compute a training output data set, and then backward propagation operations are performed to compute the weight gradients. The weights at each neural network layer can then be updated using the weight gradients. Moreover, the training process typically involves supplying the neural network with multiple sets of training input data to cover different input scenarios, such that the neural network can be trained to provide a correct decision over a wide range of input. The computing system that implements the neural network will need to perform training on a large number of input data sets, which further increases the training time. The training process may also require a higher precision than the inference operation, resulting in additional strain on the computational resources.

One way to accelerate a training process, especially for deep learning neural networks, is to use a distributed system in which the training process is distributed across multiple computing systems, each of which can be configured as a processing node (or simply a node). Each processing node may include a computing device, a server, multiple servers, or multiple levels of computing devices. In distributed deep learning based on data parallelism, a training input data set can be split into multiple portions, with each portion to be processed by a processing node using the same neural network model and the same set of initial weights. Each processing node can perform the forward and backward propagation operations independently based on its portion of the training input data to generate a set of weight gradients for each neural network layer. At each iteration of the training process, each set of weight gradients can be synchronized among the processing nodes using a process called gradient exchange.

In certain examples, Stochastic gradient descent (SGD) algorithm can be used to perform multiple iterations of training, and results of each iteration can be incorporated into the neural network model in preparation for the next iteration. The iterations can be performed on multiple processing nodes synchronously or asynchronously. Gradient exchange based on the asynchronous SGD may include each processing node sending their set of weight gradients to a server. The server can incorporate the set of weight gradients received from each node into the model, which can be downloaded by each node for the next iteration. Gradient exchange based on the synchronous SGD may include exchanging the set of weight gradients synchronously among the processing nodes. Each processing node can then average all the set of gradients to have the same copy of the updated set of weight gradients for the next iteration. Collective compute algorithms are known for performing computations with distributed data. For example, collective compute operations including reduce, all-reduce, scatter, broadcast, gather, or all-gather can be used to exchange the set of gradients computed by multiple processing nodes.

Communication among the processing nodes to perform the gradient exchange can contribute to additional latency and impact the overall training performance. As an example, in a case where the distributed system is in a cloud infrastructure and the processing nodes exchange weight gradients with each other by sending network packets, the network latency can be substantial. As such, the network latency to exchange weight gradients can diminish the reduction in the training time brought by the distributed system, or even increase the training time when a large number of processing nodes are used. Thus, it is desirable to minimize the latency introduced by the gradient exchange process used to perform the training.

Latency may depend upon the amount of data exchanged among the processing nodes, number of processing nodes in the training system, and number of steps taken to exchange the data. Various topologies to perform gradient exchange may include ring, double binary tree (DBT), 2D torus, distance halving/doubling, among others. Certain topologies may provide the same amount of data scaling per node; however, the number of steps may vary. Higher number of steps may contribute to higher latency since each step can incur an overhead. High Latency can increase the cost of compute and affect the system performance. Thus, it is desirable to maintain low data scaling per node and reduce latency steps required to perform the training. Hypercubes can provide a solution for collective compute based topology using all-reduce, which can be split into scatter-reduce and all-gather operations. Separate scatter-reduce and all-gather operations can allow better utilization of the bandwidth between the nodes, in contrast to the DBT which can only support the single step all-reduce operations. However, hypercubes can only support a number of processing nodes that is a power of 2.

Certain embodiments can provide lower latency and better latency scaling using an on-chip small-scale distributed parameter serving engine on each processing node to perform gradient exchange using collective compute strategies. Generally, for M number of processing nodes, a hypercube can yield log (M) latency scaling using collective compute strategies. The processing nodes may be fully connected in a mesh, similar to a switched interconnect such as Ethernet. Certain embodiments can allow generalizing a hypercube into a hyper-rectangle to support the training systems with a number of processing nodes that is not a power of 2. For example, a system with M number of processing nodes that is equal to a power of 2 can be made into a hypercube. For all other values of M, a hyper-rectangle can be employed. A hyper-rectangle can include processing nodes on the vertices and along the edges. Additionally, inner edges can be added to the hyper-rectangle such that the hyper-rectangle is effectively composed of hypercubes.

In certain embodiments, a hybrid all-reduce operation can be performed using an on-chip collective parameter serving engine on each processing node in a system of processing nodes configured as a hyper-rectangle of N-dimensions. A distributed small-scale collective parameter server engine that resides on a processing node can be called herein as an on-chip collective parameter server node according to some embodiments. Reduction can be performed along one dimension of the N-dimensions at a time according to a sequence of dimensions. For example, for each dimension of the hyper-rectangle, all nodes on a same edge, including inner edges, in a corresponding dimension can perform a scatter-reduce operation. The amount of data reduced in each dimension is based on a number of processing nodes on the same edge in that dimension. After the scatter-reduce operation has completed, an all-gather operation can be performed for each dimension of the hyper-rectangle in a reverse order of the sequence of dimensions.

Note that as used herein, the term "scatter-reduce" generally refers to a technique of exchanging data where each node of a system receives some data from another node and combines the received data with its own subset of data, and the term "all-gather" generally refers to a technique of exchanging data where each node of a system receives some data from another node and replaces its own subset of data with the received data. Although these terms may sometimes be used in the context of collective compute data exchange, the use of these terms herein is not limited to collective compute environments, and can be applied to any of the hybrid environments described herein.

Certain embodiments can allow flexibility in configuring the M number of processing nodes based on the physical topology supported by the distributed compute system. In certain embodiments, M number of processing nodes can be configured as a network represented as a hyper-rectangle with N dimensions. Configuration may include determining N numeric factors of M and assigning a number of processing nodes in each of the N dimensions to correspond to one of the N numeric factors. In certain embodiments, the N numeric factors can be N prime factors of M. The distributed computing system comprising the M number of processing nodes can be used to perform data exchange operations such as the gradient exchange operations. Different optimization techniques may be employed for configuring the hyper-rectangle in order to maximize the system performance and minimize the latency for data transfers.

Certain embodiments can allow collapsing two or more dimensions of the hyper-rectangle into fewer dimensions based on one or more of a node limit, network topology, bandwidth supported by each link in the network, latency of each link in the network, or characteristics of connectivity between the processing nodes and the network of processing nodes as a whole. For example, the node limit can indicate the maximum number of allowable nodes in each dimension, and therefore the hyper-rectangle can be re-configured with reduced dimensions based on the node limit. The flexibility to configure and re-configure the hyper-rectangle can allow determining an appropriate limit on the number of nodes in each dimension to maximize the system performance.

In certain embodiments, placement of the processing nodes on difference edges and/or dimensions of the hyper-rectangle may be based on optimizing the bandwidth and/or latency supported by the hardware. Furthermore, placement of the processing nodes on difference edges of the hyper-rectangle can be balanced to optimize the speed for the gradient exchange process. Additional examples of various optimizations will be described further below.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a training process 100 to train a neural network. A training process can be performed by, for example, a neural network hardware accelerator that implements the neural network, a general-purpose hardware processor, or other suitable computing systems that support the arithmetic operations involved in neural network processing as described above. The training can be based on a gradient descent scheme, which may include forward propagation operations, loss gradient operation, and backward propagation operations.

As shown in FIG. 1, a forward propagation operation can be performed for each neural network layer, such as a forward propagation operation 102a for the lowest layer 1, a forward propagation operation 102b for layer 2, a forward propagation operation 102n for the highest layer n, etc. A forward propagation operation at a neural network layer can include the multiplication and summation computations between input data and a set of weights for that layer, followed by activation function processing to generate output data. The output data can then propagate to the next neural network layer as input to the forward propagation operation at that layer. For example, as shown in FIG. 1, forward propagation operation 102a can combine training input data with a set of weights W1 of layer 1 to generate output data OUT1, which can propagate to layer 2 as input. Forward propagation operation 102b can combine data OUT1 with a set of weights W2 of layer 2 to generate output data OUT2, which can propagate to the next layer. At the highest layer n, forward propagation operation 102n receive data OUTn−1 from layer n−1 (not shown in FIG. 1), combine with a set of weights Wn of layer n, and generate output data OUTn.

A loss gradient operation 104 can compare the output data OUTn of layer n against reference output data REFOUT to generate input data gradients Din. The input data gradients Din can measure a rate of difference between OUTn and REFOUT with respect to each data element of output data OUTn. In some examples, an objective of the training is to minimize the difference between OUTn and REFOUT such that the input data gradients Din become close to zero.

Following the generation of input data gradients Din by loss gradient operation 104, a backward propagation operation 106 can be performed for each neural network layer. For example, a backward propagation operation 106n can be performed at highest layer n, a backward propagation operation 106b can be performed at layer 2, a backward propagation operation 106a can be performed at layer 1. A backward propagation operation at a neural network layer can be based on the set of weights of that neural network layer, the data gradient input to that neural network layer, as well as the input to the forward propagation operation of that layer. For example, for layer n, backward propagation operation 106n can receive, as inputs, a set of weights Wn, input data OUTn−1 (from forward propagation operation at neural network layer n−1), and input data gradient Din. The backward propagation operation can perform multiplication and summation computations on the input to generate output data gradients (Dn−1, D2, D1, etc. in FIG. 1) and sets of weight gradients (dWn, dW2, dW1, etc. in FIG. 1). The output data gradients can be forwarded to the next lower neural network layer as inputs to the backward propagation operation in that layer, whereas the set of weight gradients can represent changes to be applied to the set of weights at a neural network layer. The set of weights at layer n can be updated by an update operation 108 (e.g., update operation 108n for layer n) based on a set of weight gradients dWn based on the following equation:

$$Wn' = Wn - \alpha \times dWn \quad \text{(Equation 1)}$$

In Equation 1, Wn' can refer to the updated set of weights Wn, whereas α can include a set of pre-determined constants.

The output data gradients Dn−1 generated by layer n can then propagate to the next lower neural network layer n−1 as input to the backward propagation operation at that layer. Backward propagation operation 102b of layer 2 can operate on data gradients D2, a set of weights W2, and input data OUT11 to generate output data gradients D1 as well as a set of weight gradients dW2. The set of weight gradients dW2 can be used by update operation 108b to update a set of weights W2 based on Equation 1. Data gradients D1 can propagate to layer 1. Backward propagation operation 102a of layer 1 can operate on data gradients D2, a set of weights W1, and training input data to generate a set of weight gradients dW1. The set of weight gradients dW1 can be used by update operation 108a to update the set of weights W1 based on Equation 1. Each of the sets of weights (W1-Wn), sets of weight gradients (dW1-dWn), data gradients (D1-Dn), input data, output data (OUT1-OUTn), and reference output (REFOUT) can be tensors of suitable size.

A training process may typically involve supplying the neural network with multiple sets of training input data to cover different operation conditions, such that the neural network can be trained to provide a correct decision under those different operation conditions. Due to limited computation resources, the computing system (e.g., a neural network hardware accelerator) may lack the capability to use all the training input data sets at one time to perform the training. Instead, the training input data can be split into multiple portions. The computing system can perform the training process sequentially in batches, with each batch to operate on a portion of the training input data.

A distributed system can be used to accelerate the training process by distributing the training process across multiple computing devices, each of which can be configured as a processing node. Each processing node may include a compute unit, a server, multiple servers, or multiple levels of compute units. Each processing node can include a communication interface to communicate with each other via a computer network. Each processing node may include computing resources to perform the operations of a training process including forward propagation operations, backward propagation operations, weight update operations, etc. The computing resources may include, for example, one or more of a neural network processor, neural network accelerator, a graphics processing unit (GPU), a field programmable gate array (FPGA), a processor or co-processor, an application specific integrated circuit (ASIC), and/or other suitable computing circuitry that support the arithmetic operations involved in the training process. Each processing node can communicate, via the computer network, with other processing nodes to exchange weight gradients and perform weight updates after the exchange operations are completed.

Distributing the training process across multiple processing nodes can reduce the amount of training data to be processed at each processing node, which can reduce the time of completion of the forward and backward propagation operations and accelerate the training process. For example, as the volume of training data processed by each processing nodes is reduced, the durations of the forward propagation operation and backward propagation operation can be shorter. Each processing node can perform the forward and backward propagation operations independently based on a portion of the training input data to generate a set of weight gradients for each neural network layer. At each iteration of the training process, the set of weight gradients can be synchronized among the processing nodes using the gradient exchange process. However, exchange of the weight gradients among the processing nodes can introduce additional latency in the training process. For example, in a case where the distributed system is in a cloud infrastructure and each processing node exchanges weight gradients with each other by sending network packets, the network latency can be substantial relative to the times of completion of the forward/backward propagation operations. This is further discussed with reference to FIGS. 2A-2E using a ring network topology for the gradient exchange process.

FIGS. 2A-2F illustrate a gradient exchange process 200 based on the ring network topology to exchange a set of weight gradients among three processing nodes.

A processing node 202, a processing node 204, and a processing node 206 may be connected in a ring network with each processing node connected to two other processing nodes. In the ring network, data between the nodes can be transferred in a single direction. For example, the processing node 202 may compute a set of weight gradients comprising subsets dW1a, dW2a, and dW3a. The processing node 204 may compute a set of weight gradients comprising subsets dW1b, dW2b, and dW3b. The processing node 206 may compute a set of weight gradients comprising subsets dW1c, dW2c, and dW3c. Each processing node can exchange 2 out of the 3 subsets of their respective weight gradients so that each processing node can reduce one of the subsets of the weight gradients using collective compute operations. Once each processing node has reduced their respective subset, an all-gather operation can be performed to exchange the reduced subsets among the processing nodes so that each processing node has the same reduced subset of weight gradients. The scatter-reduce operation is explained with reference to FIGS. 2A-2C, and the all-gather operation is performed with reference to FIGS. 2D-2F.

For a three-node ring, each processing node 202, 204, or 206 can collect a respective subset of the weight gradients from the other two processing nodes in two steps. For example, the processing node 204 may collect a first subset of the weight gradients from the processing node 202 and processing node 206, the processing node 206 may collect a second subset of the weight gradients from the processing node 202 and processing node 204, and the processing node 202 may collect a third subset of the weight gradients from the processing node 204 and processing node 206.

Figure 2A:
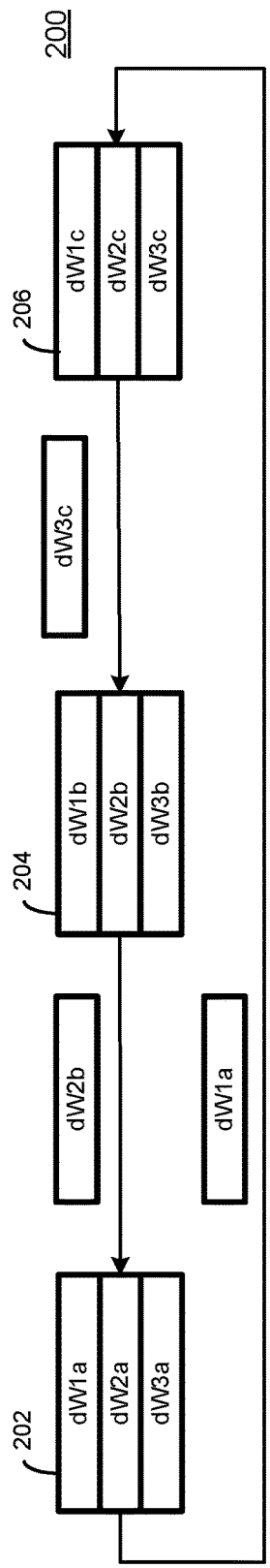
FIGS. 2A-2F illustrate a gradient exchange process based on the ring network topology to exchange a set of weight gradients among 3 processing nodes.
Figure 2B:
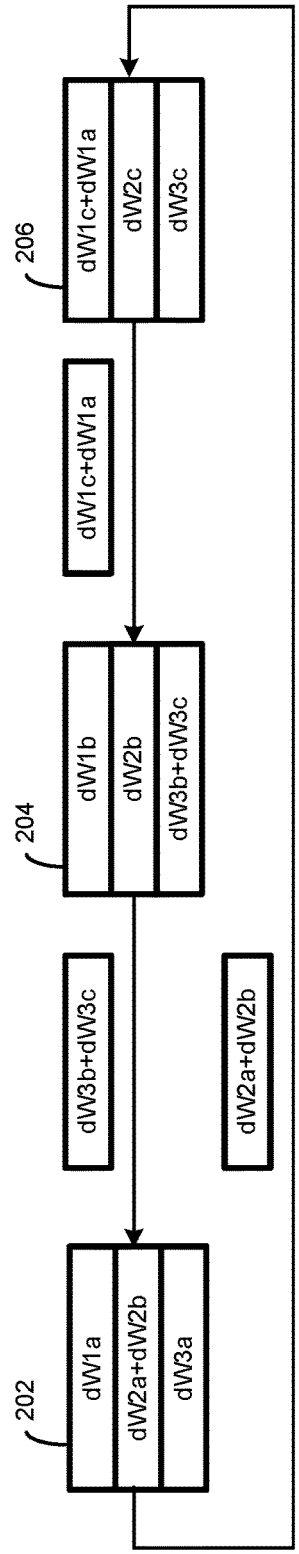
Figure 2C:
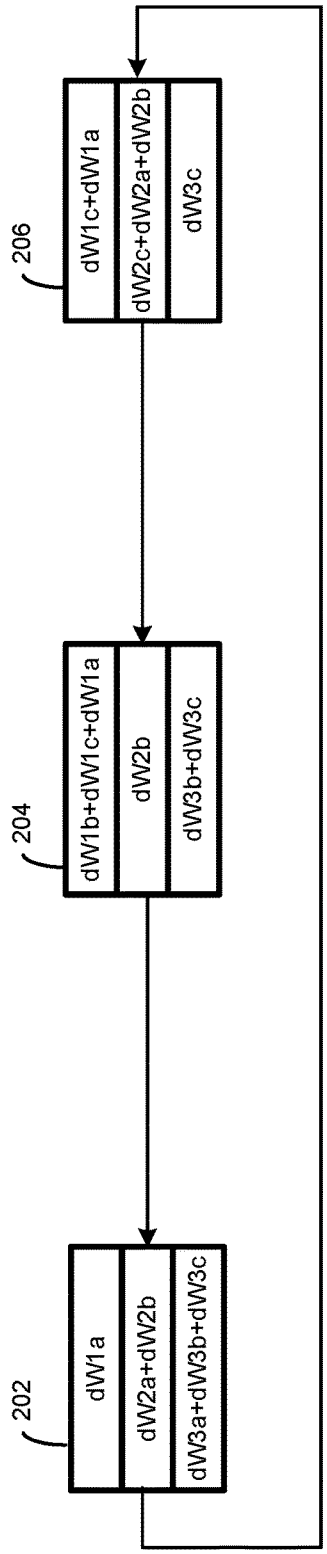

The processing node 206 may transfer the subset dW3c to the processing node 204 in a first step, as shown in FIG. 2A. The processing node 204 may collect the subset dW3c and perform a reduce operation on the subset dW3c and the subset dW3b to generate a reduced subset dW3b+dW3c, as shown in FIG. 2B. In a second step, the processing node 204 may transfer the reduced subset dW3b+dW3c to the processing node 202. The processing node 204 may collect the reduced subset dW3b+dW3c and perform a reduce operation on the subset dW3a and the reduced subset dW3b+dW3c to generate a final reduced subset dW3a+dW3b+dW3c, as shown in FIG. 2C.

Similarly, the processing node 204 may transfer the subset dW2b to the processing node 202 in the first step, as shown in FIG. 2A. The processing node 202 may collect the subset dW2b and perform a reduce operation on the subset dW2b and the subset dW2a to generate a reduced subset dW2a+dW2b, as shown in FIG. 2B. In the second step, the processing node 202 may transfer the reduced subset dW2a+dW2b to the processing node 206. The processing node 206 may collect the reduced subset dW2a+dW2b and perform a reduce operation on the subset dW2c and the reduced subset dW2a+dW2b to generate a final reduced subset dW2c+dW2a+dW2b, as shown in FIG. 2C.

Similarly, the processing node 202 may transfer the subset dW1a to the processing node 206 in the first step, as shown in FIG. 2A. The processing node 206 may collect the subset dW1a and perform a reduce operation on the subset dW1a and the subset dW1c to generate a reduced subset dW1c+ dW1a, as shown in FIG. 2B. In the second step, the processing node 206 may transfer the reduced subset dW1c+dW1a to the processing node 204. The processing node 204 may collect the reduced subset dW1c+dW1a and perform a reduce operation on the subset dW1b and the reduced subset dW1c+dW1a to generate a final reduced subset dW1b+dW1c+dW1a, as shown in FIG. 2C.

Once each processing node has collected and reduced a respective subset of the weight gradients from the other two processing nodes, an all-gather operation can be performed to exchange the respective subset of the weight gradients among the processing nodes in two steps, as discussed with reference to FIGS. 2D-2F.

Figure 2D:
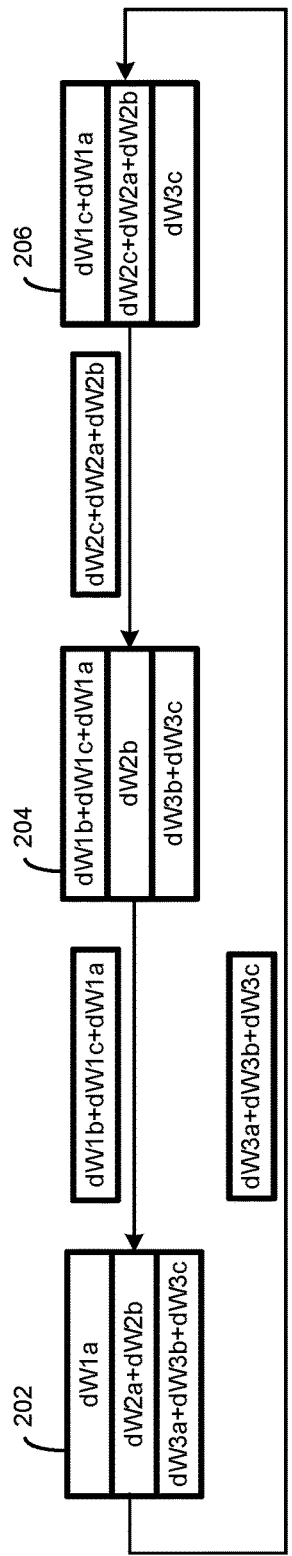
Figure 2E:
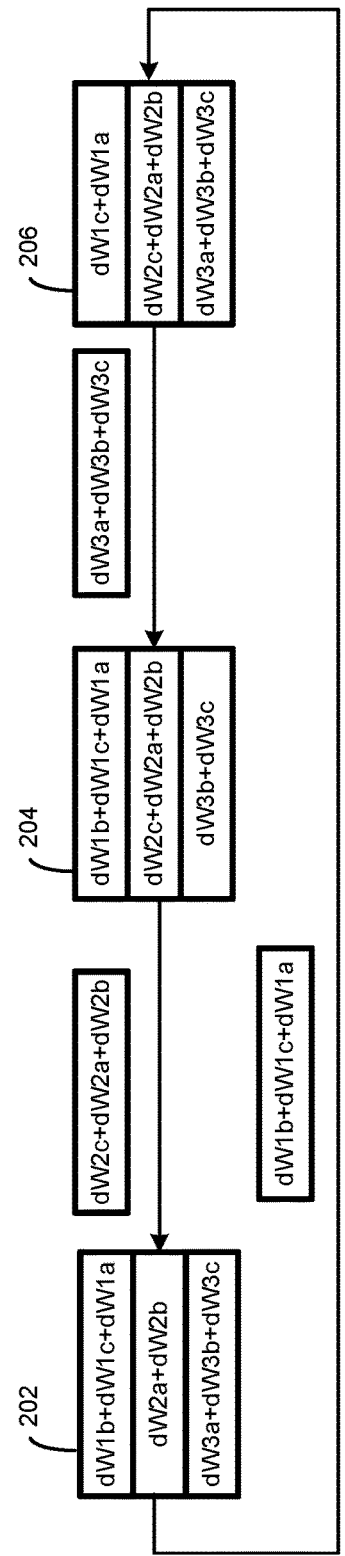
Figure 2F:
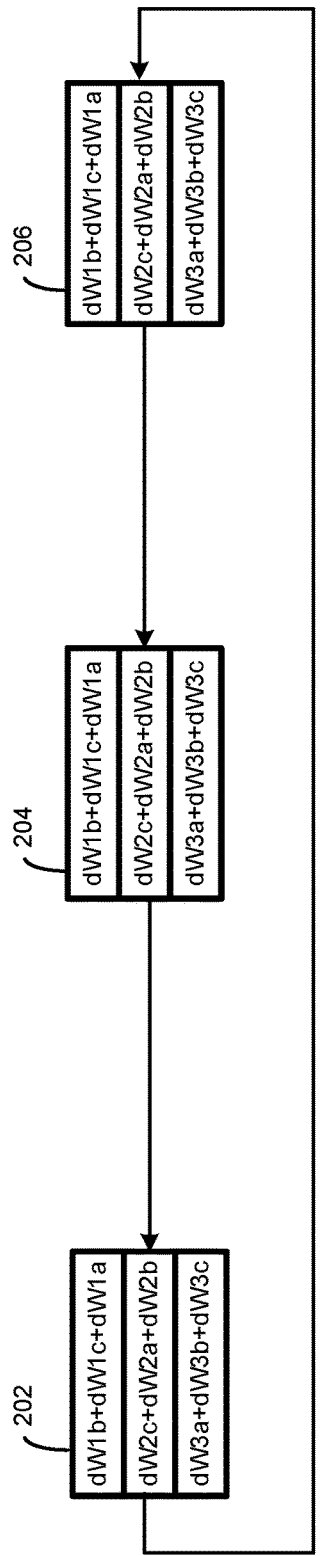

As shown in FIG. 2D, in the first step, the processing node 202 can gather the final reduced subset dW1b+dW1c+dW1a from the processing node 204, the processing node 204 can gather the final reduced subset dW2c+dW2a+dW2b from the processing node 206, and the processing node 206 can gather the final reduced subset dW3a+dW3b+dW3c from the processing node 202. As shown in FIG. 2E, in the second step, the processing node 202 can gather the final reduced subset dW2c+dW2a+dW2b from the processing node 204, the processing node 204 can gather the final reduced subset dW3a+dW3b+dW3c from the processing node 206, and the processing node 206 can gather the final reduced subset dW1b+dW1c+dW1a from the processing node 202. As shown in FIG. 2F, each processing node 202, 204, and 206 can now have the same copy of the reduced set of weight gradients. Thus, for the 3-node ring, the gradient exchange can be performed in 4 steps.

For M number of processing nodes, the gradient exchange process based on the ring topology can be performed in 2(M−1) number of steps. As the number of nodes increase, the number of steps may increase; however, the data transferred by each node may be same. For example, each processing node may transfer 1/M data at a time. Higher number of steps can be costly since each step may incur overhead due to additional computing resources used for the reduction. Additionally, communication among higher number of nodes can introduce additional delays in the training process.

Hypercubes can provide log (M) latency scaling using collective compute strategies. The processing nodes can be physically connected as a hypercube or can utilize a switched interconnect such as Ethernet to implement a fully connected mesh. Hypercube implementation can allow all-reduce operations for gradient exchange when all the processing nodes are fully connected, as discussed with reference to FIGS. 3A-3B.

Figure 3A:
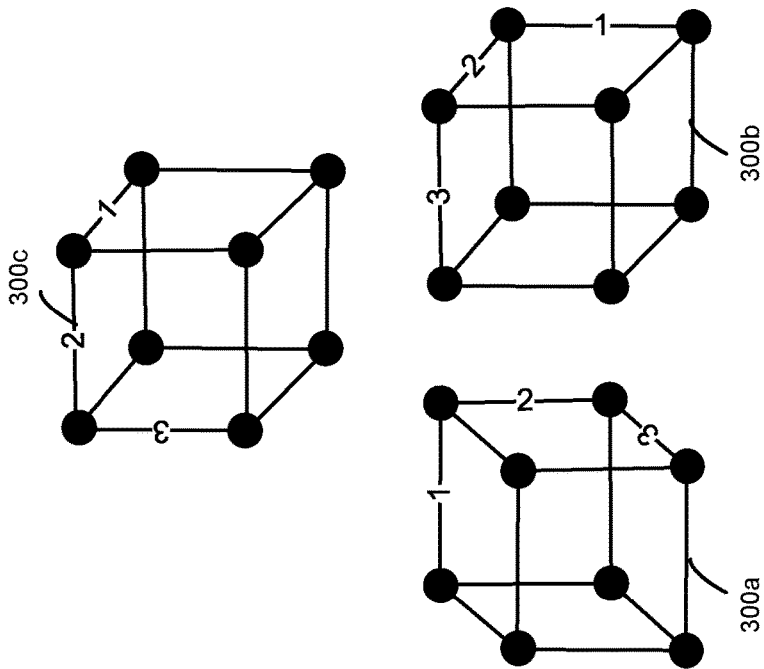

FIGS. 3A-3B illustrate steps for gradient exchange for different dimensions of hypercubes. The tensor may represent a set of weight gradients computed by a processing node.

FIG. 3A shows a reduction sequence for gradient exchange for a 3-dimensional hypercube 300a, a reduction sequence for gradient exchange for a 3-dimensional hypercube 300b, and a reduction sequence for gradient exchange for a 3-dimensional hypercube 300c. The hypercubes 300a, 300b, and 300c can be orthogonal to each other. In certain embodiments, the three orthogonal hypercubes 300a, 300b, and 300c can reduce data in parallel in 3 different dimensions at every step to avoid link contention. In a switch or mesh implementation, bandwidth of all 3 hypercubes can be merged together. For example, the hypercube 300 can follow a first reduction sequence as shown in a legend 302a. A second orthogonal hypercube can follow a second reduction sequence as shown in a legend 302b. A third orthogonal hypercube can follow a third sequence as shown in a legend 302c.

As shown in the legend 302a for the hypercube 300a, in step 1, each processing node can divide its tensor in half and exchange with other processing node in a first dimension (e.g., x-dimension). In step 2, each processing node can further divide the reduced tensor in half and exchange one fourth of the tensor with other processing node in a second dimension (e.g., y-dimension). In step 3, each processing node can further divide the reduced tensor in half and exchange one eighth of the tensor with other processing node in a third dimension (e.g., z-dimension).

As shown in the legend 302b for the hypercube 300b, in step 1, each processing node can divide its tensor in half and exchange with other processing node in the y-dimension. In step 2, each processing node can further divide the reduced tensor in half and exchange one fourth of the tensor with other processing node in z-dimension. In step 3, each processing node can further divide the reduced tensor in half and exchange one eighth of the tensor with other processing node in x-dimension. As shown in the legend 302c for the hypercube 300c, in step 1, each processing node can divide its tensor in half and exchange with other processing node in the z-dimension. In step 2, each processing node can further divide the reduced tensor in half and exchange one fourth of the tensor with other processing node in x-dimension. In step 3, each processing node can further divide the reduced tensor in half and exchange one eighth of the tensor with other processing node in y-dimension.

FIG. 3B shows a sequence for gradient exchange for a 4-dimensional hypercube 304. As shown in a legend 306 for the hypercube 304, in step 1, each processing node can divide its tensor by half and exchange with other processing nodes in a first dimension. In step 2, each processing node can further divide the reduced tensor in half and exchange one fourth of the tensor with other processing nodes in a second dimension. In step 3, each processing node can divide the reduced tensor in half and exchange one eighth of the tensor with other processing nodes in a third dimension. In step 4, each processing node can further divide the reduced tensor in half and exchange one sixteenth of the tensor with other processing nodes in a fourth dimension.

As an example, total latency for a system comprising M processing nodes configured as a hypercube, where M is a power of 2, can be derived as shown below in Equation 2.

$$\text{Total latency } L = \text{latency\_per\_step} * \log(M). \quad \text{(Equation 2)}$$

Furthermore, total data transferred per processing node, S, is shown below using Equation 3.

$$S = S\_gradient * \text{SUM}(0.5^{\wedge}(2^{\wedge}i)) \text{ for } i=1 \ldots \log(M). \quad \text{(Equation 3)}$$

S_gradient is size of a tensor representing the set of weight gradients.

Generally, as the number of processing nodes increases (e.g., M→∞), S approaches 1 (e.g., S→1).

Thus, as shown in FIGS. 3A and 3B, the set of weight gradients can be divided successively by half, which can allow performing the all-reduce operations on the set of weight gradients. For example, the all-reduce operation can be equivalent to a scatter-reduce operation followed by an all-gather operation. Any system with M equal to a power of 2 can be configured as a hypercube, and for all the other values of M that are not a power of 2, the hypercube can be generalized as a hyper-rectangle, as discussed with reference to FIGS. 4A-4E.

FIGS. 4A-4E illustrate example hyper-rectangles for different number of processing nodes. A hypercube can be thought of as a special case of hyper-rectangles in which all edges have the same number of processing nodes.

FIG. 4A shows a single processing node (e.g., M=1), which can represent a zero-dimensional hypercube. FIG. 4B shows 2 processing nodes (e.g., M=2), which can represent a one-dimensional hypercube. FIG. 4C shows 4 processing nodes (e.g., M=4), which can represent a two-dimensional hypercube.

Certain embodiments can support values of M that are not a power of 2 by configuring the processing nodes as a hyper-rectangle. The hyper-rectangle may be configured to include processing nodes on its vertices and along its edges. A set of hypercubes can be converted to a hyper-rectangle by connecting certain edges of the hypercubes so that the hyper-rectangle is an assembly of hypercubes. For example, as shown in FIG. 4D, a 2×3 hyper-rectangle can be represented as an assembly of two-dimensional hypercubes when the middle nodes are connected, as shown by a dotted line. Similarly, as shown in FIG. 4E, a 2×3×3 hyper-rectangle can be represented as an assembly of three-dimensional hypercubes by adding inner edges shown by the dotted lines. Generalizing the hypercube to hyper-rectangle can allow performing all-reduce operations for gradient exchange as discussed with reference to FIGS. 3A-3B to extend to systems with various number of processing nodes. Weight gradients of the processing nodes along dimensions of the hyper-rectangle can be reduced based on an algorithm as described with a flow chart in FIG. 5.

Figure 5:
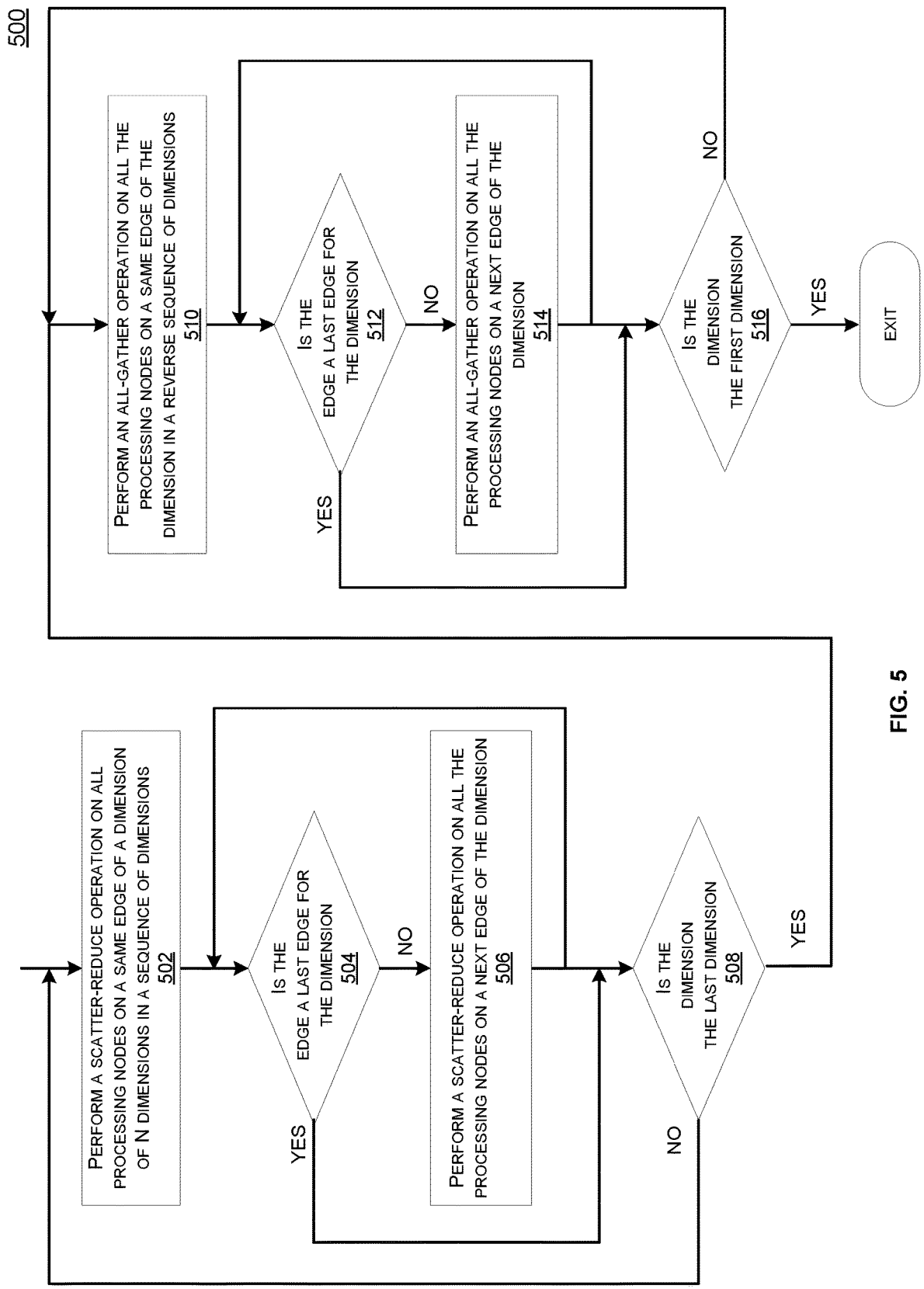
FIG. 5 illustrates a flow chart, which can be used to describe an algorithm to perform data exchange among processing nodes of an N-dimensional hyper-rectangle using all-reduce operations, according to certain embodiments.

FIG. 5 illustrates a flow chart 500 which can be used to describe an algorithm to perform data exchange among processing nodes of an N-dimensional hyper-rectangle using all-reduce operations, according to certain embodiments. In certain examples, data exchange may be performed to exchange a set of weight gradients computed by each processing node from an iteration of the training process. Certain embodiments can support distributed computations by splitting the all-reduce operations into scatter-reduce operations and all-gather operations, which can allow the use of certain optimization algorithms like Adam, among others.

At step 502, the algorithm may include performing a scatter-reduce operation on all processing nodes on a same edge of a dimension of N dimensions in a sequence of dimensions. The sequence of dimensions may include a first dimension, a second dimension, . . . , and an Nth dimension. For example, all the processing nodes on a first edge of a first dimension can perform a scatter-reduce operation to reduce the set of weight gradients. For each dimension, the set of weight gradients can be reduced by a number of processing nodes on the same edge in the dimension.

At step 504, the algorithm may include determining whether the first edge is a last edge for the first dimension. If the first edge is the last edge, the algorithm may jump to a step 508.

At step 506, the algorithm may include performing a scatter-reduce operation on all the processing nodes on a second edge of the first dimension upon determining that the first edge is not the last edge. The algorithm may continue performing a scatter-reduce operation on all the processing nodes for each edge of the first dimension by executing steps 504 and 506 until the last edge has been reduced.

At step 508, the algorithm may include determining whether the first dimension is a last dimension. If the first dimension is not the last dimension, the algorithm may go back to step 502 and execute the steps 502-508 for all the N-dimensions until the last dimension has been operated on.

At step 510, the algorithm may include performing an all-gather operation on all the processing nodes on a same edge of the dimension in a reverse sequence of dimensions. The reverse sequence of dimensions may include the Nth dimension, an (N-1)th dimension, . . . , and the first dimension. For example, all the processing nodes on a first edge of the Nth dimension can perform an all-gather operation to gather the reduced set of weight gradients.

At step 512, the algorithm may include determining whether the first edge is a last edge for the Nth dimension. If the first edge is the last edge, the algorithm may jump to a step 516.

At step 514, the algorithm may include performing an all-gather operation on all the processing nodes on a second edge of the Nth dimension upon determining that the first edge is not the last edge. The algorithm may continue performing the all-gather operation on all the processing nodes for each edge of the Nth dimension by executing steps 512 and 514 until the last edge has been reduced.

At step 516, the algorithm may include determining whether the Nth dimension is a first dimension. If the Nth dimension is not the first dimension, the algorithm may go back to step 510 and execute the steps 512-516 for all the N-dimensions until the first dimension has been operated on. Once the last edge of the first dimension has been operated on, the algorithm may exit, and the gradient exchange process has completed, as shown at step 518. Results of the gradient exchange process can be used to update the weights for the training process.

Certain embodiments can provide systems and methods to reduce the latency for gradient exchange by allowing each processing node to function as an on-chip collective parameter server node. Each on-chip collective parameter server node can be configured to collect a respective subset of the weight gradients from other processing nodes to perform a reduction operation and an all-gather operation. This is further explained with reference to FIGS. 6A-6C.

Figure 6C:
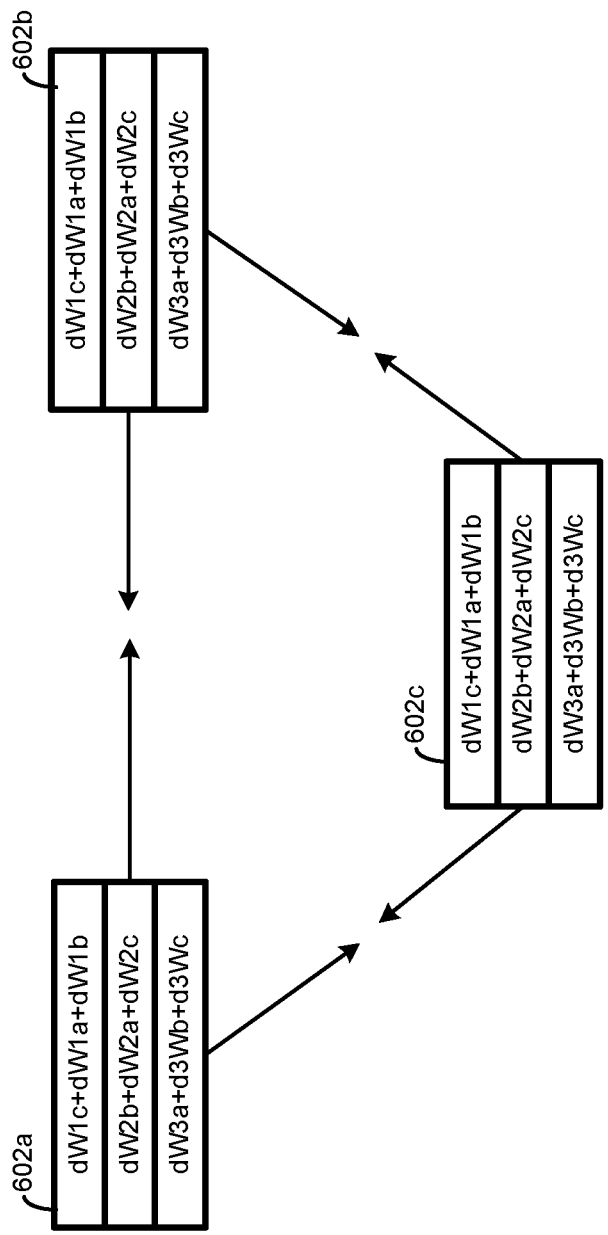

FIGS. 6A-6C illustrate a gradient exchange process 600 based on the algorithm to exchange a set of weight gradients among 3 processing nodes configured as collective parameter server nodes.

A processing node 602a, a processing node 602b, and a processing node 602c may be connected via a fully connected network. As an example, the processing nodes 602a-602c may be connected as a 1×3 hyper-rectangle. The processing node 602a may compute a set of weight gradients comprising subsets dW1a, dW2a, and dW3a. The processing node 602b may compute a set of weight gradients comprising subsets dW1b, dW2b, and dW3b. The processing node 602c may compute a set of weight gradients comprising subsets dW1c, dW2c, and dW3c.

Each processing node may be configured to perform collective compute operations for a certain subset of the weight gradients. For example, the processing node 602a may be configured to perform collective compute operations on a third subset of the weight gradients, the processing node 620b may be configured to perform collective compute operations on a second subset of the weight gradients, and the processing node 602c may be configured to perform collective compute operations on a first subset of the weight gradients.

Certain embodiments can allow exchanging two out of 3 subsets in a single step as shown in FIG. 6A. For example, the processing node 602a can transfer the subset dW1a to the processing node 602c that is configured to collect the first subset, and transfer the subset dW2a to the processing node 602b that is configured to collect the second subset. Similarly, the processing node 602c can transfer the subset dW3b to the processing node 602a that is configured to collect the third subset, and transfer the subset dW1b to the processing node 602c that is configured to process the first subset. Finally, the processing node 602c can transfer the subset dW3c to the processing node 602a that is configured to process the third subset, and transfer the subset dW2c to the processing node 602b that is configured to process the second subset. Thus, two-thirds of the gradient data can be exchanged in a single step as compared to two steps consumed by the ring topology as discussed with reference to FIGS. 2A and 2B.

Each processing node can perform a reduce operation on its assigned subsets. For example, the processing node 602a can perform a reduce operation on the third subsets dW3a, dW3b, and dW3c to produce a reduced subset dW3a+dW3b+dW3c. Similarly, processing node 602b can perform a reduce operation on the second subsets dW2b, dW2a, and dW2c to produce a reduced subset dW2b+dW2a+dW2c. Additionally, the processing node 602c can perform a reduce operation on the first subsets dW1a, dW1b, and dW1c to produce a reduced subset dW1c+dW1a+dW1b.

Each processing node may perform an all-gather operation to gather the reduced subsets from each processing node. The processing node 602a can gather the reduced second subsets computed by the processing node 602b and the reduced first subsets computed by the processing node 602c. The processing node 602b can gather the reduced third subsets computed by the processing node 602a and the reduced first subsets computed by the processing node 602c. The processing node 602c can gather the reduced second subsets computed by the processing node 602b and the reduced third subsets computed by the processing node 602a. As shown in FIG. 6B, the processing node 602a can gather the dW1c+dW1a+dW1b from the processing node 602c and the dW2b+dW2a+dW2c from the processing node 602b. The processing node 602b can gather the dW3a+dW3b+dW3c from the processing node 602a and the dW1c+dW1a+dW1b from the processing node 602c. The processing node 602c can gather the dW3a+dW3b+dW3c from the processing node 602a and the dW2b+dW2a+dW2c from the processing node 602b.

After the all-gather operation is complete, each processing node can have the same copies of all the reduced subsets as shown in FIG. 6C. For example, each of the processing nodes 602a, 602b, and 602c can have the reduced subsets of weight gradients dW1c+dW1a+dW1b, dW2b+dW2a+dW2c, and the dW3a+dW3b+dW3c. Thus, the 3 processing nodes configured as the collective parameter server nodes can perform gradient exchange using half the number of steps as compared to the 3 processing nodes connected in a ring, as discussed with reference to FIGS. 2A-2E. Furthermore, as compared to the single-step all-reduce operations used by the DBT algorithm, certain embodiments can allow the use of scatter-reduce and all-gather operations to perform distributed computations.

FIGS. 7A-7F illustrate a gradient exchange process 700 performed by a 2×3 hyper-rectangle based on the algorithm, according to certain embodiments. Each processing node may be configured as a collective parameter server node to perform a collective compute operation on a subset of the weight gradients. Each processing node of the 6 processing nodes may perform a first pass of a training process of a neural network to compute a respective set of weight gradients. Each of the set of weight gradients can be represented using tensors of suitable size.

As an example, a first processing node 702 may compute a set of weight gradients comprising six weight gradients $A_1$, $B_1$, $C_1$, $D_1$, $E_1$, and $F_1$, a second processing node 704 may compute a set of weight gradients comprising six weight gradients $A_2$, $B_2$, $C_2$, $D_2$, $E_2$, and $F_2$, a third processing node 706 may compute a set of weight gradients comprising six weight gradients $A_3$, $B_3$, $C_3$, $D_3$, $E_3$, and $F_3$, a fourth processing node 708 may compute a set of weight gradients comprising six weight gradients $A_4$, $B_4$, $C_4$, $D_4$, $E_4$, and $F_4$, a fifth processing node 710 may compute a set of weight gradients comprising six weight gradients $A_5$, $B_5$, $C_5$, $D_5$, $E_5$, and $F_5$, and a sixth processing node 712 may compute a set of weight gradients comprising six weight gradients $A_6$, $B_6$, $C_6$, $D_6$, $E_6$, and $F_6$. Note that six weight gradients for each set of weight gradients are used herein for discussion purposes. It will be understood that the embodiments are not limited to any specific number of the weight gradients computed by each processing node.

Each processing node may perform, for each of the N-dimensions that the processing node is part of, a scatter-reduce operation, according to a sequence of dimensions, on the set of weight gradients with processing nodes that are on a same edge of a corresponding dimension to generate reduced weight gradients. Performing the scatter-reduce operation for a dimension may include splitting the set of weight gradients into P subsets, where P equals the number of processing nodes on the same edge of the dimension. Each subset may include a different portion of the set of weight gradients. Performing the scatter-reduce operation for the dimension may further include transmitting a respective subset of the P subsets to each processing node of (P−1) processing nodes on the same edge of the dimension, and collecting a respective subset corresponding to a remaining subset of the P subsets from each of the (P−1) processing nodes on the same edge of the dimension. Performing the scatter-reduce operation for the dimension may further include performing a reduce operation on the remaining subset of the P subsets and the collected respective subsets from the (P−1) processing nodes on the same edge of the dimension to generate the reduced weight gradients. In certain embodiments, the scatter-reduce operation for a dimension can be performed in parallel with other processing nodes of an orthogonal dimension.

For example, the first processing node 702 can be part of a first dimension (y-dimension) and a second dimension (x-dimension) of the 2-dimensions (N=2) of the hyper-rectangle. The first processing node 702 and the fourth processing node 708 may be on a first edge in the y-direction, the second processing node 704 and the fifth processing node 710 may be on a second edge in the y-direction, and the third processing node 706 and the sixth processing node 712 may be on a third edge in the y-direction. The first processing node 702 may perform a scatter-reduce operation with the fourth processing node 708, the second processing node 704 may perform a scatter-reduce operation with the fifth processing node 710, and the third processing node 706 may perform a scatter-reduce operation with the sixth processing node 712.

Performing the scatter-reduce operation for the y-dimension may include splitting the set of weight gradients into P subsets, wherein P equals a number of processing nodes on the same edge of the dimension. Each edge on the y-dimension has 2 processing nodes (e.g., P=2). For example, the first processing node 702 may split its set of weight gradients into a first subset $A_1$, $B_1$, $C_1$ (3 weight gradients) and a second subset $D_1$, $E_1$, $F_1$ (3 weight gradients). The fourth processing node 708 may split its set of weight gradients into a $A_2$, $B_2$, $C_2$ (3 weight gradients) and a second subset $D_4$, $E_4$, $F_4$ (3 weight gradients). Similarly, the second processing node 704 may split its set of weight gradients into a first subset $A_2$, $B_2$, $C_2$ (3 weight gradients) and a second subset $D_2$, $E_2$, $F_2$ (3 weight gradients). The fifth processing node 710 may split its set of weight gradients into a first subset $A_5$, $B_5$, $C_5$ (3 weight gradients) and a second subset $D_5$, $E_5$, $F_5$ (3 weight gradients). The third processing node 706 may split its set of weight gradients into a first subset $A_3$, $B_3$, $C_3$ (3 weight gradients) and a second subset $D_3$, $E_3$, $F_3$ (3 weight gradients). The sixth processing node 712 may split its set of weight gradients into a first subset $A_6$, $B_6$, $C_6$ (3 weight gradients) and a second subset $D_6$, $E_6$, $F_6$ (3 weight gradients).

The first processing node 702 may transmit the first subset $A_1$, $B_1$, $C_1$ of the 2 subsets to the fourth processing node 708. The first processing node 702 may have the second subset $D_1$, $E_1$, $F_1$ (3 weight gradients) of the 2 subsets remaining. The first processing node 702 may collect the second subset $D_4$, $E_4$, $F_4$ (3 weight gradients), corresponding to the remaining second subset $D1$, $E_1$, $F_1$ (3 weight gradients) of the first processing node 702, from the fourth processing node 708. For example, the fourth processing node 708 would have transmitted the second subset $D_4$, $E_4$, $F_4$ of the 2 subsets to the first processing node 702, and would have the first subset $A_4$, $B_4$, $C_4$ remaining. The first processing node 702 can now perform the reduce operation on the remaining second subset $D_1$, $E_1$, $F_1$ of the first processing node 702 and the collected second subset $D_4$, $E_4$, $F_4$ from the fourth processing node 708 to generate the reduced weight gradients $D_{4,1}$, $E_{4,1}$, $F_{4,1}$. For example, the reduce operation may include performing an average, mean, or sum operations on the subsets $D_1$, $E_1$, $F_1$ and $D_4$, $E_4$, $F_4$ to generate the reduced weight gradients $D_{4,1}$, $E_{4,1}$, $F_{4,1}$. The reduced weight gradients $D_{4,1}$, $E_{4,1}$, $F_{4,1}$ may represent the reduced set of weight gradients for the first processing node 702 for a first dimension of the N-dimensions.

Similarly, the fourth processing node 708 may collect the first subset $A_1$, $B_1$, $C_1$ corresponding to the remaining first subset $A_4$, $B_4$, $C_4$ of the fourth processing node 708, transmitted by the first processing node 702. The fourth processing node 708 can now perform the reduce operation on the remaining first subset $A_4$, $B_4$, $C_4$ of the fourth processing node 708 and the collected first subset $A_1$, $B_1$, $C_1$ from the first processing node 702 to generate the reduced weight gradients $A_{1,4}$, $B_{1,4}$, $C_{1,4}$. The reduced weight gradients $A_{1,4}$, $B_{1,4}$, $C_{1,4}$ may represent the reduced set of weight gradients for the fourth processing node 708 for the first dimension of the N-dimensions. Thus, the set of weight gradients exchanged between the first processing node 702 and the fourth processing node 708 may be reduced by half.

Similarly, the second processing node 704 may transmit the first subset $A_2$, $B_2$, $C_2$ to the fifth processing node 710, collect the second subset $D_5$, $E_5$, $F_5$ from the fifth processing node 710, and perform the reduce operation to generate the reduced weight gradients $D_{5,2}$, $E_{5,2}$, $F_{5,2}$. The reduced weight gradients $D_{5,2}$, $E_{5,2}$, $F_{5,2}$ may represent the reduced set of weight gradients for the second processing node 704 for a first dimension of the N-dimensions. Similarly, the fifth processing node 710 may transmit the second subset $D_5$, $E_5$, $F_5$ to the second processing node 704, collect the first subset $A_2$, $B_2$, $C_2$ from the second processing node 704, and perform the reduce operation to generate the reduced weight gradients $A_{2,5}$, $B_{2,5}$, $C_{2,5}$. The reduced weight gradients $A_{2,5}$, $B_{2,5}$, $C_{2,5}$ may represent the reduced set of weight gradients for the fifth processing node 710 for a first dimension of the N-dimensions.

Similarly, the third processing node 706 may transmit the first subset $A_3$, $B_3$, $C_3$ to the sixth processing node 712, collect the second subset $D_6$, $E_6$, $F_6$ from the sixth processing node 712, and perform the reduce operation to generate the reduced weight gradients $D_{6,3}$, $E_{6,3}$, $F_{6,3}$. The reduced weight gradients $D_{6,3}$, $E_{6,3}$, $F_{6,3}$ may represent the reduced set of weight gradients for the third processing node 706 for a first dimension of the N-dimensions. Similarly, the sixth processing node 712 may transmit the second subset $D_6$, $E_6$, $F_6$ to the third processing node 706, collect the first subset $A_3$, $B_3$, $C_3$ from the third processing node 706, and perform the reduce operation to generate the reduced weight gradients $A_{3,6}$, $B_{3,6}$, $C_{3,6}$. The reduced weight gradients $A_{3,6}$, $B_{3,6}$, $C_{3,6}$ may represent the reduced set of weight gradients for the sixth processing node 712 for a first dimension of the N-dimensions. All the edges in the first dimension can be reduced in parallel. The tensor size exchanged in the first dimension may include half of the total tensor size.

The reduced weight gradients generated by the processing node for a given dimension can be used as the set of weight gradients to be operated on for performing the scatter-reduce operation for a subsequent dimension in the sequence of dimensions. For example, the reduced weight gradients generated by the first processing node 702 for the y-dimension can be used as the set of weight gradients to be operated on for performing the scatter-reduce operation for the x-dimension, as shown in FIG. 7B.

For example, for the second dimension, P equals 3 corresponding to the first processing node 702, second processing node 704, and the third processing node 706 on the same edge of the x-dimension. The set of weight gradients to be operated on for performing the scatter-reduce operation may include the reduced weight gradients generated in the previous dimension. As shown in FIG. 7B, the set of weight gradients for the first processing node 702 may include $D_{4,1}$, $E_{4,1}$, $F_{4,1}$, the set of weight gradients for the second processing node 704 may include $D_{5,2}$, $E_{5,2}$, $F_{5,2}$, and the set of weight gradients for the third processing node 706 may include $D_{6,3}$, $E_{6,3}$, $F_{6,3}$. The first processing node 702 can split the set of weight gradients into 3 subsets. A first subset may include $D_{4,1}$, a second subset may include $E_{4,1}$, and a third subset may include $F_{4,1}$. Similarly, the second processing node 704 can split the set of weight gradients into 3 subsets ($D_{5,2}$, $E_{5,2}$, and $F_{5,2}$), and the third processing node 706 can split the set of weight gradients into 3 subsets ($D_{6,3}$, $E_{6,3}$, and $F_{6,3}$).

The first processing node 702 may transmit the third subset $F_{4,1}$ of the 3 subsets to the third processing node 706, and the second subset $E_{4,1}$ of the 3 subsets to the second processing node 704. The first processing node 702 may have the first subset $D_{4,1}$ of the 3 subsets remaining. The first processing node 702 may collect the second subset $D_{5,2}$ from the second processing node 704, and the third subset $D_{6,3}$ from the third processing node 706, corresponding to the remaining first subset $D_{4,1}$ of the first processing node 702. The first processing node 702 can now perform the reduce operation on the remaining first subset $D_{4,1}$ of the first processing node 702, the collected second subset $D_{5,2}$ from the second processing node 704, and the third subset $D_{6,3}$ from the third processing node 706 to generate the reduced weight gradients $D_{1,2,3,4,5,6}$. The reduced weight gradients $D_{1,2,3,4,5,6}$ may represent the reduced set of weight gradients for the first processing node 702 for a second dimension of the N-dimensions, as shown in FIG. 7C.

Figure 7C:
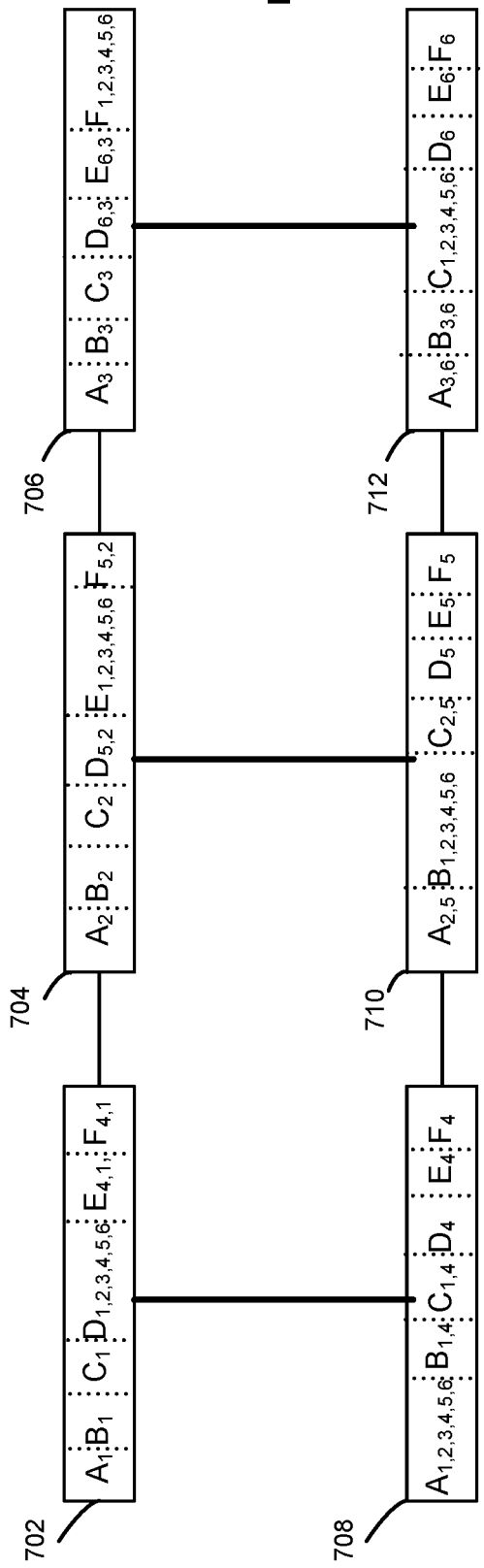

Similarly, reduced weight gradients $E_{1,2,3,4,5,6}$ may represent the reduced set of weight gradients for the second processing node 704, reduced weight gradients $F_{1,2,3,4,5,6}$ may represent the reduced set of weight gradients for the third processing node 706, reduced weight gradients $A_{1,2,3,4,5,6}$ may represent the reduced set of weight gradients for the fourth processing node 708, reduced weight gradients $B_{1,2,3,4,5,6}$ may represent the reduced set of weight gradients for the fifth processing node 710, and reduced weight gradients $C_{1,2,3,4,5,6}$ may represent the reduced set of weight gradients for the sixth processing node 712 for a second dimension of the N-dimensions, as shown in FIG. 7C.

The set of weight gradients may be reduced by ½ in the first dimension, and further by ⅓ in the second dimension. Thus, the second dimension may utilize lower bandwidth than the first dimension since the amount of data exchanged in the second or later dimension can be smaller as compared to the first or earlier dimension. The reduced weight gradients for each of the processing nodes 702-712 may be reduced by one-sixth, as shown in FIG. 7C. Thus, each processing node may include a respective subset of the reduced weight gradients, which can be exchanged using an all-gather operation in a reverse sequence. For example, the all-gather operation can be performed by all the edges in parallel for the x-dimension. Performing the all-gather operation for the x-dimension may include transmitting the reduced weight gradients to the processing nodes on the same edge of the x-dimension, and collecting respective reduced weight gradients from the processing nodes on the same edge of the x-dimension to generate the updated weight gradients.

Figure 7D:
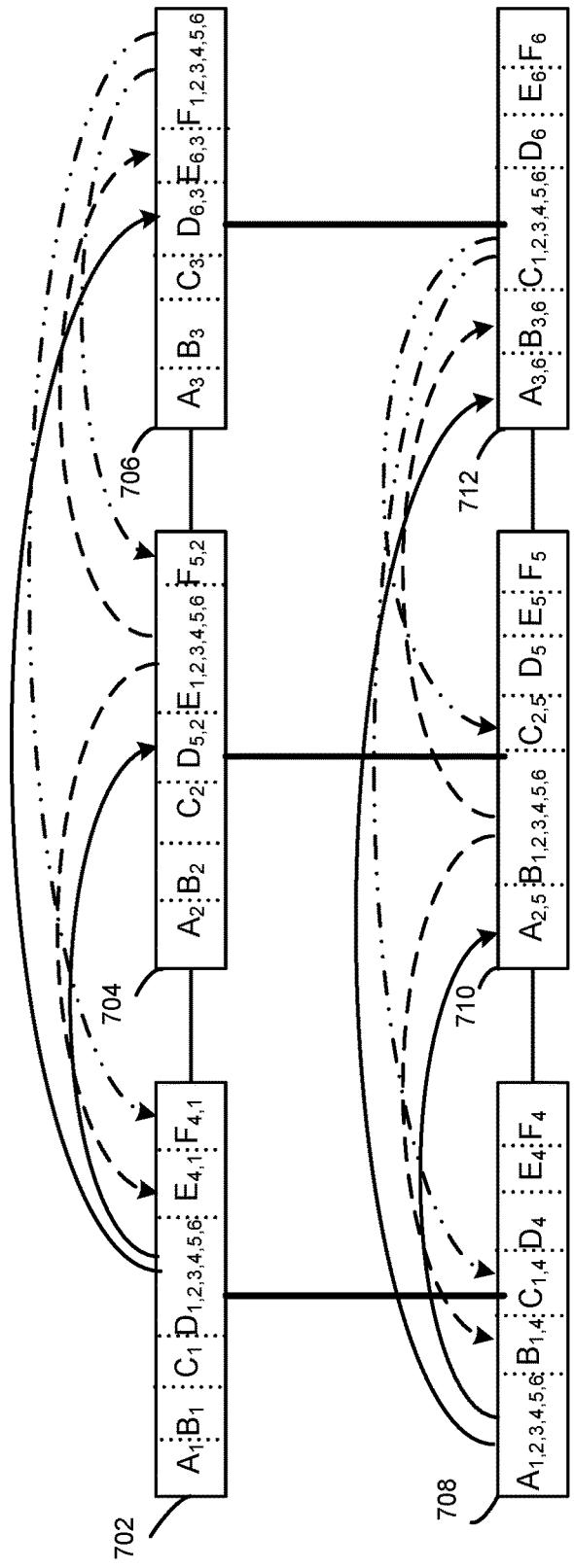

For example, as shown in FIG. 7D, the first processing node 702 may transmit the reduced weight gradients $D_{1,2,3,4,5,6}$ to the second processing node 704 and the third processing node 706 that are on the same edge of the x-dimension. The first processing node 702 may also collect the reduced weight gradients $E_{1,2,3,4,5,6}$ from the second processing node 704 and the reduced weight gradients $F_{1,2,3,4,5,6}$ from the third processing node 706 to generate the updated weight gradients $D_{1,2,3,4,5,6}$, $E_{1,2,3,4,5,6}$, $F_{1,2,3,4,5,6}$. Similarly, the second processing node 704 may generate the updated weight gradients $D_{1,2,3,4,5,6}$, $E_{1,2,3,4,5,6}$, $F_{1,2,3,4,5,6}$, and the third processing node 706 may generate the updated weight gradients $D_{1,2,3,4,5,6}$, $E_{1,2,3,4,5,6}$, $F_{1,2,3,4,5,6}$.

Similarly, the fourth processing node 708 may transmit the reduced weight gradients $A_{1,2,3,4,5,6}$ to the fifth processing node 710 and the sixth processing node 712 that are on the same edge of the x-dimension. The fourth processing node 708 may also collect the reduced weight gradients $B_{1,2,3,4,5,6}$ from the fifth processing node 710 and the reduced weight gradients $C_{1,2,3,4,5,6}$ from the sixth processing node 712 to generate the updated weight gradients $A_{1,2,3,4,5,6}$, $B_{1,2,3,4,5,6}$, $C_{1,2,3,4,5,6}$. Similarly, the fifth processing node 710 may generate the updated weight gradients $A_{1,2,3,4,5,6}$, $B_{1,2,3,4,5,6}$, $C_{1,2,3,4,5,6}$ and the sixth processing node 712 may generate the updated weight gradients $A_{1,2,3,4,5,6}$, $B_{1,2,3,4,5,6}$, $C_{1,2,3,4,5,6}$.

Figure 7E:
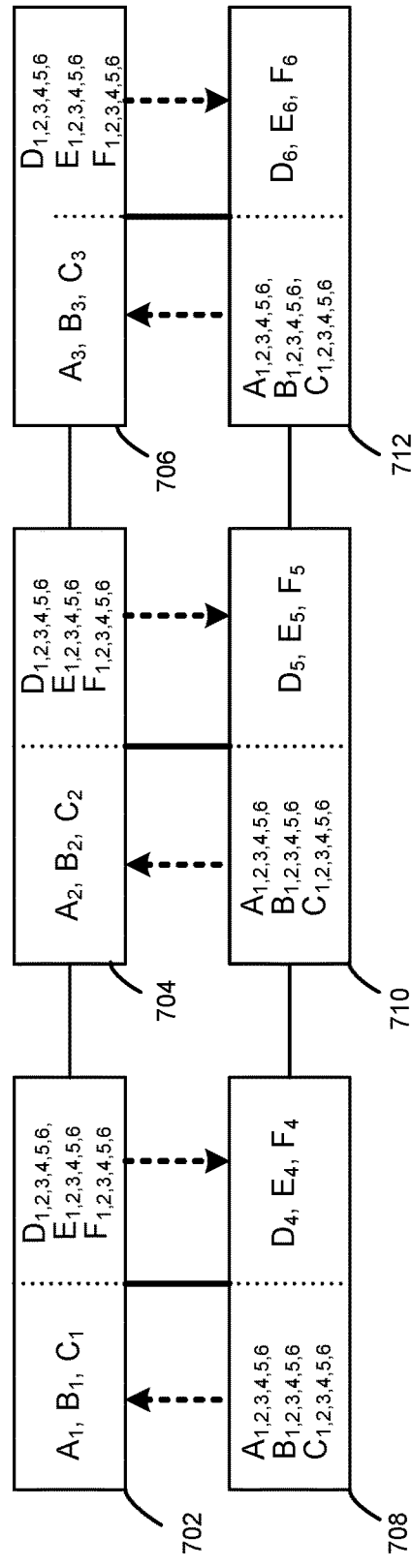

Next, the all-gather operation may be performed in the y-dimension. For example, as shown in FIG. 7E, the first processing node 702 may transmit the updated weight gradients $D_{1,2,3,4,5,6}$, $E_{1,2,3,4,5,6}$, $F_{1,2,3,4,5,6}$ to the fourth processing node 708 that is on the same edge of the y-dimension. The first processing node 702 may also collect the updated weight gradients $A_{1,2,3,4,5,6}$, $B_{1,2,3,4,5,6}$, $C_{1,2,3,4,5,6}$ from the fourth processing node 708. Similarly, the second processing node 704 and the fifth processing node 710 may exchange their updated weight gradients, and the third processing node 706 and the sixth processing node 712 may exchange their updated weight gradients, as shown in FIG. 7E.

Figure 7F:
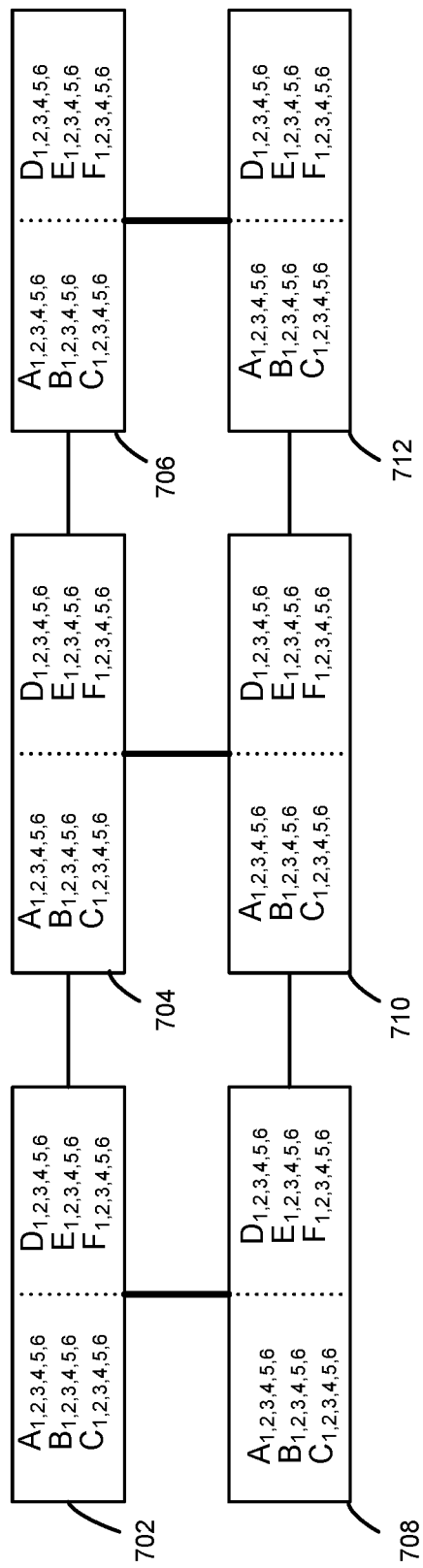

FIG. 7F shows the final updated weight gradients for each processing node after performing the all-gather operation in the y-dimension. Thus, each processing node may have the same updated weight gradients $A_{1,2,3,4,5,6}$, $B_{1,2,3,4,5,6}$, $C_{1,2,3,4,5,6}$, $D_{1,2,3,4,5,6}$, $E_{1,2,3,4,5,6}$, $F_{1,2,3,4,5,6}$ after performing the scatter-reduce and all-gather operations as discussed with reference to FIGS. 7A-7F. The updated weight gradients can be used by each processing node for a next iteration of the training process.

In certain embodiments, based on available bandwidth on the network links for different dimensions of the hyper-rectangle, the scatter-reduce and all-gather operations can be performed in parallel for each dimension. This is further explained with reference to FIG. 8.

Figure 8:
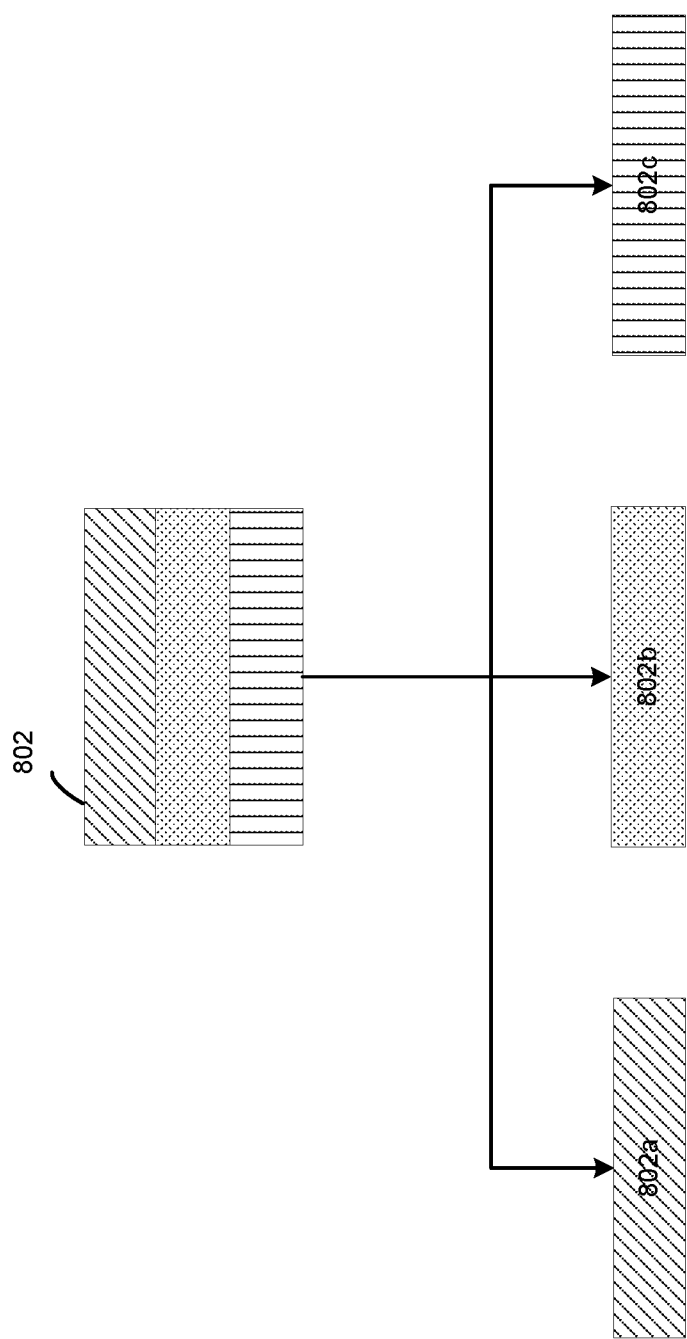
FIG. 8 illustrates a process, which can be used to describe performing the gradient exchange process in parallel on all the dimensions of a hyper-rectangle, according to certain embodiments.

FIG. 8 illustrates a process 800, which can be used to describe performing the gradient exchange process in parallel on all the dimensions of a hyper-rectangle, according to certain embodiments. Each processing node may be configured as a collective parameter server node to perform a collective compute operation on a subset of the weight gradients.

A set of weight gradients 802 can be computed by a processing node of the M processing nodes that are configured as a 3-dimensional hyper-rectangle. In certain examples, each dimension of the hyper-rectangle can have a dedicated physical network which can allow performing the gradient exchange process on all the dimensions simultaneously. As shown in FIG. 8, the set of weight gradients 802 can be split horizontally into N portions for the N-dimensions of the hyper-rectangle. For example, the set of weight gradients 802 can be split into 3 portions (e.g., N=3) comprising a first set of weight gradients 802a, a second set of weight gradients 802b, and a third set of weight gradients 802c.

Each set of weight gradients 802a, 802, and 802c can be operated on in parallel to perform the scatter-reduce operation and all-gather operation. For example, the first set of weight gradients 802a can be operated on by all the processing nodes in a first dimension, the second set of weight gradients 802b can be operated on by all the processing nodes in a second dimension, and the third set of weight gradients 802c can be operated on by all the processing nodes in a third dimension. As an example, as discussed with reference to FIG. 3A, the first set of weight gradients 802a can be operated on by the hypercube 300a, the second set of weight gradients 802b can be operated on by the hypercube 300a, and the third set of weight gradients 802c can be operated on by the hypercube 300c. The three orthogonal hypercubes 300a, 300b, and 300c can reduce the respective set of weight gradients in parallel using the algorithm described with reference to FIG. 5.

FIGS. 9A-9D illustrate different configurations 900 for a hyper-rectangle according to certain embodiments.

Certain embodiments can allow configuring the M number of processing nodes as a network represented as a hyper-rectangle with N dimensions. The configuration of the M processing nodes may include determining number of dimensions of the hyper-rectangle, number of edges in each dimension, and number of processing nodes on each edge. The configuration may include a physical configuration or logical configuration. Each processing node can operate as an on-chip collective parameter server node to perform collective compute operations on a small scale. For example, each processing node can be configured to operate as a collective parameter server node to perform collective compute operations on a portion of a set of weight gradients. Each processing node may include a hierarchy of processing nodes, and each processing node in a hierarchical level may be capable of performing distributed training within same hierarchical level. For example, each processing node may include a plurality of neural network processors, and each neural network processor may be capable of performing distributed training within the processing node.

In certain embodiments, a host processor may receive a request to configure the M number of processing nodes of a distributed neural network training system to perform a training process of a neural network. The host processor may determine N numeric factors based on the M number of processing nodes in the request and configure the M number of processing nodes as a network represented as a hyper-rectangle with N dimensions. The number of processing nodes in each of the N dimensions may correspond to one of the N numeric factors. In certain examples, the N numeric factors can be N prime factors of M. In other examples, M can be a prime number, and the N numeric factors can be numeric factors of a non-prime number greater than M. In certain embodiments, when M is a prime number, one or more additional regular processing nodes or collective compute parameter servers can be added in the network to make the total number of processing nodes a non-prime number. Adding a small number of regular processing nodes or collective compute parameter servers can allow balancing the overall bandwidth of the network at a minimal incremental cost.

The N numeric factors can be determined based on the physical topology supported by the distributed neural network training system. For example, the physical topology may include available communication links, bandwidth and/or speed supported by each communication link, or available hardware configuration. One or more processing nodes can be assigned to an edge or a dimension to optimize the network or connectivity characteristics, which may include bandwidth supported by each communication link, latency of each communication link, and the network topology. In certain embodiments, the number of processing nodes in each dimension may be assigned to optimize the bandwidth needed for the slowest or fastest communication link to perform data exchange operations.

In certain embodiments, two or more dimension of the hyper-rectangle can be collapsed into fewer dimensions based on one or more of a node limit, network topology, bandwidth of each link in the network, latency of each link in the network, or network characteristics. For example, two or more dimensions of the hyper-rectangle can be collapsed into one dimension if the number of processing nodes in the collapsed dimension is less than the node limit.

In certain embodiments, an agent (e.g., a network architect or an engineer) can determine a desirable configuration of the hyper-rectangle to provide maximum bandwidth or minimum latency for data exchange operations between the processing nodes, and the hardware can be configured accordingly to support the desired configuration of the hyper-rectangle. For example, a group of processing nodes (e.g., compute machines) can be in a first physical location, and another group of processing nodes (e.g., compute machines) can be in a second physical location, distant from the first physical location. The two groups of the processing nodes can be coupled via an Ethernet switch, which can represent one of the dimensions of the hyper-rectangle network.

Once the M processing nodes are configured, the host processor may initiate the M number of processing nodes to perform a training process. Each processing node may compute a set of weight gradients as part of the training process. The host processor can then trigger a gradient exchange process to exchange respective weight gradients among the M number of processing nodes by performing the scatter reduce operation and the all-gather operation as discussed with reference to FIGS. 6A-6C and FIGS. 7A-7E. The scatter-reduce operation can be performed according to a sequence of the N dimensions (e.g., 1, 2, . . . , N−1, N), and the all-gather operation can be performed in a reverse order of the sequence of the N dimensions (e.g., N, N−1, . . . , 2, 1). In certain embodiments, the scatter-reduce operation can be performed for a dimension with a fewer number of processing nodes before a dimension with a greater number of processing nodes.

In certain embodiments, the configuration of the hyper-rectangle can be changed between different gradient exchange operations. As an example, the set of weight gradients may include multiple portions, and one portion can be exchanged at a time, sequentially. Certain embodiments can allow re-configuration of the hyper-rectangle between the exchange process for different portions. For example, in some cases, the network traffic or the load can change, or a communication link can be down, which can change the network characteristics. Thus, certain embodiments can allow re-configuring the hyper-rectangle by changing the assignment of the processing nodes to maximize the available bandwidth and minimize the latency.

Figure 9A:
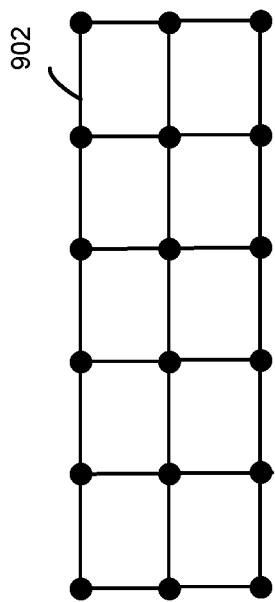
FIGS. 9A-9D illustrate different configurations for a hyper-rectangle according to certain embodiments.
Figure 9B:
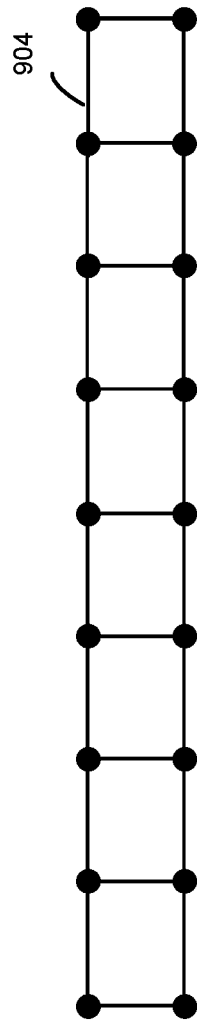
Figure 9C:
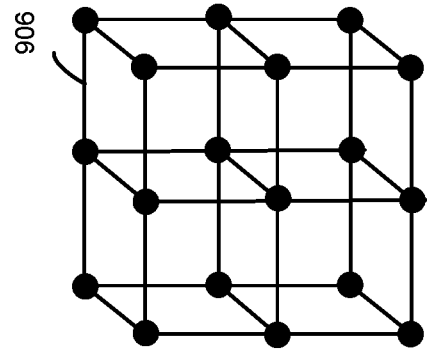

FIGS. 9A-9C show 3 possible configurations of the M processing nodes (e.g., M=18) based on different possible numeric factors of 18. As an example, different numeric factors of 18 can include 3×6, 2×9, and 2×3×3. FIG. 9A shows a hyper-rectangle 902 with 3 processing nodes in a first dimension and 6 processing nodes in a second dimension. FIG. 9B shows a hyper-rectangle 904 with 2 processing nodes in a first dimension and 9 processing nodes in a second dimension. FIG. 9C shows a hyper-rectangle 906 with 3 processing nodes in a first dimension, 3 processing nodes in a second dimension, and 2 processing nodes in a third dimension.

Certain embodiments can allow re-configuring a hyper-rectangle based on a node limit specified in the request. For example, the host processor may determine whether two or more dimensions of the hyper-rectangle are collapsible into one dimension if the number of processing nodes in the collapsed dimension is less than the node limit. If the two or more dimensions of the hyper-rectangle are collapsible, the host processor may re-configure the hyper-rectangle with a reduced number of dimensions. For example, the host processor may collapse the hyper-rectangle 906 with 3-dimensions into the hyper-rectangle 902 with 2-dimensions based on the node limit of 8. However, the hyper-rectangle 906 cannot be collapsed into the hyper-rectangle 904 since the number of processing nodes in one of the directions can exceed the node limit of 8. The flexibility to configure and re-configure the hyper-rectangle can allow determining an appropriate limit on the number of nodes in each dimension to maximize the system performance.

In various embodiments, one or more optimization techniques can be employed when configuring the M processing nodes as a hyper-rectangle with N dimensions, which can accelerate the gradient exchange process. As an example, in some cases, a configuration of the hyper-rectangle may be selected based on the desired bandwidth for the data exchange process. As discussed previously, later dimensions may utilize lower bandwidth since smaller amount of data may be exchanged compared to the earlier dimensions. Thus, fewer number of processing nodes can be placed in earlier dimensions (e.g., shorter edges) as compared to later dimensions (e.g., longer edges), since the data transferred is calculated per edge per dimension per node. For example, for N number of nodes in a dimension, the data transferred can be (1-1/N)*N.

As an example, 6 processing nodes (e.g., M=6) can be configured as a 2×3 hyper-rectangle or a 3×2 hyper-rectangle. The total data transferred per node can be the same for both the configurations; however, the optimization may depend upon whether the bandwidth for the slower link or the faster link needs to be minimized. For example, performing the gradient exchange process for the 2×3 hyper-rectangle, as discussed with reference to FIGS. 7A-7F, may include exchanging ½ of the set of weight gradients in step 1, and exchanging ⅖ of the set of weight gradients in step 2. Similarly, performing the gradient exchange process for the 3×2 hyper-rectangle may include exchanging ⅔ of the set of weight gradients in step 1, and exchanging ⅙ of the set of weight gradients in step 2. Thus, in step 1 (or earlier dimension), less data may be transferred for the 2×3 configuration as compared to the 3×2 configuration. Similarly, in step 2 (or later dimension), less data may be transferred for the 3×2 configuration as compared to the 2×3 configuration. Since the earlier dimensions may utilize higher bandwidth than the later dimensions, if the goal is to minimize the maximum bandwidth then the 2×3 configuration can be selected, and if the goal is to minimize minimum bandwidth then the 3×2 configuration can be selected.

In certain embodiments, a placement of the processing nodes on the same edge for a given dimension is based on balancing a respective speed of all edges for the given dimension. For example, placement of the processing nodes on the same edge for all vertical edges for the hypercube 906 can be based on balancing the respective speed of all the edges in the y-dimension, and placement of the processing nodes on the same edge for all horizontal edges for the hypercube 906 can be based on balancing the respective speed of all the edges in the x-dimension. The speed of all the edges for different dimensions may be based on the speed and bandwidth supported by each communication link between the processing nodes. In certain embodiments, multiple levels of interconnect hierarchies can be employed among the processing nodes, as discussed with reference to FIG. 9D.

Figure 9D:
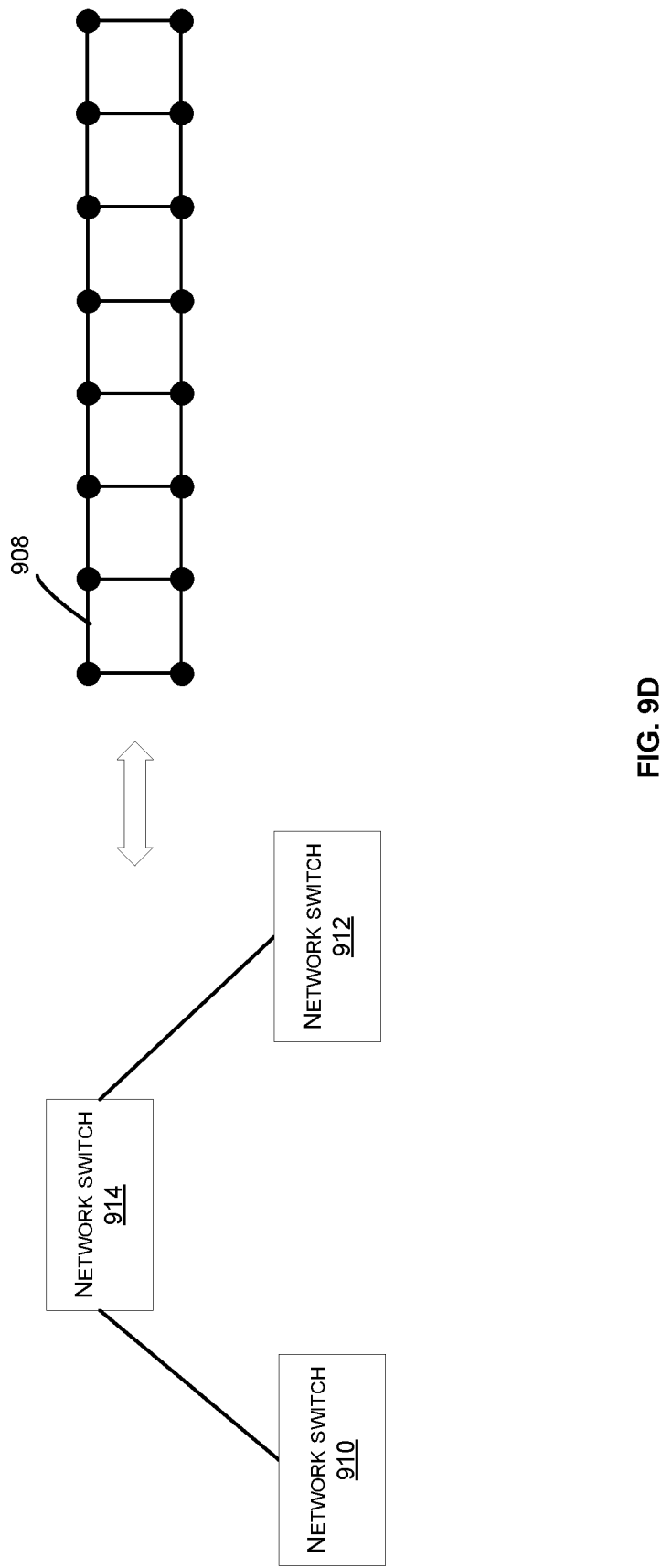

In certain embodiments, a hyper-rectangle may be configured to include different levels of interconnect hierarchies based on a location of the processing nodes, compute capacity of the processing nodes, bandwidth and speed supported by the communication links, among other factors. FIG. 9D shows a hierarchy of network switches which can be mapped to a 2×8 hyper-rectangle 908. A network switch 910 may represent 8 processing nodes on an upper edge of the hyper-rectangle 908 in the x-dimension and a network switch 912 may represent 8 processing nodes on a lower edge of the hyper-rectangle 908 in the x-dimension. All the processing nodes in the network switch 910 may be connected using a first set of PCIe links, and all the processing nodes in the network switch 912 may be connected using a second set of PCIe links. The network switch 914 may provide a network connection (e.g., Ethernet) between the network switches 910 and 912, which can represent the y-dimension of the hyper-rectangle 908.

In certain embodiments, the scatter-reduce operation for gradient exchange among the processing nodes of the network switch 910 (e.g., intra-node scatter reduce) can be performed in parallel with the scatter-reduce operation among the processing nodes of the network switch 912 (e.g., intra-node scatter reduce). Once the scatter-reduce operation is performed for both the network switches 910 and 912, the scatter-reduce operation to exchange the reduced set of weight gradients computed by both the network switches 910 and 912 can be performed over the network switch 914 (e.g., inter-node scatter-reduce). An inter-node all-gather operation among the network switches 910 and 912 can be performed over the network switch 914 before performing the intra-node all-gather operation among the processing nodes of the respective network switches 910 and 912. The intra-node all-gather operation may result in updated weight gradients which can be used for a next iteration of the training process.

In most instances, the inter-node bandwidth may be smaller than the intra-node bandwidth. Thus, it would be desirable to saturate the inter-node bandwidth throughout the gradient exchange process. In order to fully utilize the inter-node bandwidth, certain embodiments can allow pipelining the hierarchical all-reduce operations. For example, the set of weight gradients can be split into multiple chunks, and the reduction of different chunks can be pipelined. As an example, a first chunk may include the first set of weight gradients 802a, a second chunk may include the second set of weight gradients 802b, and a third chunk may include the third set of weight gradients 802c in FIG. 8. The processing nodes in the network switches 910 and 912 can reduce portions of the first chunk in parallel. When results of the reduction process of the first chunk are exchanged between the network switches 910 and 912 over the network switch 914, the processing nodes in the network switches 910 and 912 can perform the reduction process of the second chunk. Thus, by pipelining the reduction operations, slower bandwidths can be better utilized.

In certain embodiments, before performing the inter-node all-gather operation, the reduced weight gradients can be used to update the weights and the updated weights can be exchanged using the inter-node and intra-node all-gather operations. For example, in certain implementations, the gradients may include 32-bits floating point elements, whereas the weights may include 16-bits floating point elements. In such cases, exchanging the updated weights instead of the gradients can reduce the tensor size by half.

In certain embodiments, each processing node of the network switches 910 and 912 may include a plurality of neural network processors, and each neural network processor may be capable of performing distributed training within the processing node. Performing the scatter-reduce operation may include performing a scatter-reduce between the neural network processors of the processing nodes before performing the scatter-reduce with other processing nodes. Performing the all-gather operation may include performing an all-gather with other processing nodes before performing the all-gather between the neural network processors of the processing node. The scatter-reduce operation may be performed before the all-gather operation. Note that FIG. 9D shows two levels of hierarchies; however; certain embodiments can support multiple levels of hierarchies within the scope of the disclosure. For example, each network switch 910 or 912 may include multiple levels of hierarchies of the processing nodes, and each processing node in a hierarchical level can be capable of performing distributed training within same hierarchical level. For example, each node of the hyper-rectangle 908 may include 6 processing nodes configured as a 2×3 hyper-rectangle, which can perform gradient exchange within the node as described with reference to FIGS. 7A-7F. It should be noted that in scenarios where a processing node includes a hierarchy of processing nodes, the hierarchical processing nodes of the processing node can be referred to as "internal" processing nodes. The use of the term "internal" merely means that the internal processing node is a hierarchical processing node of the processing node. The term "internal" does not require the internal processing nodes (e.g., the hierarchical processing nodes) to be integrated within the same chip or the same device. As such, the internal processing nodes can reside on the same or separate chips, or be integrated within the same or separate device/system.

Figure 10:
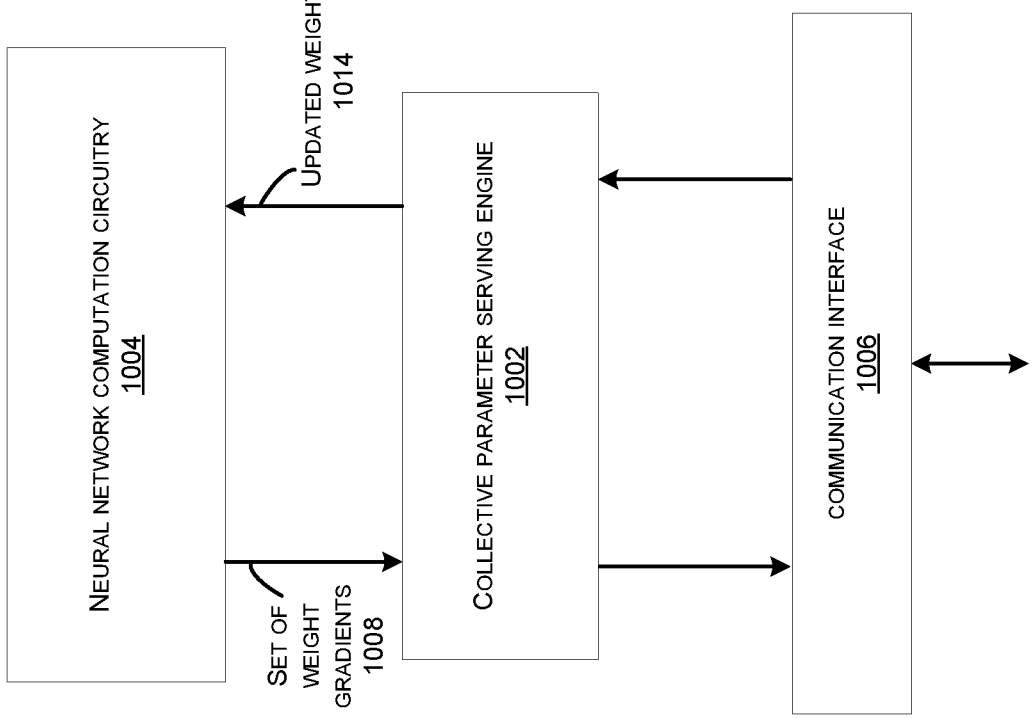
FIG. 10 illustrates an example of internal components of a computing device that can be used as a processing node of a distributed computing system, in certain embodiments.

FIG. 10 illustrates an example of internal components of a computing device 1000 that can be used as a processing node of a distributed computing system, in certain embodiments. The processing node can be part of a system of processing nodes configured as a hyper-rectangle network of N-dimensions. In certain embodiments, the distributed computing system can be used as a neural network training system. As shown in FIG. 10, the computing device 1000 may include a collective parameter serving engine 1002, neural network computation circuitry 1004, and a communication interface 1006.

The neural network computation circuitry 1004 can be implemented using one or more of a neural network processor, a neural network accelerator, a graphics processing unit (GPU), a field programmable gate array (FPGA), a co-processor, or an application specific integrated circuit (ASIC). In certain embodiments, the neural network computation circuitry 1004 may include a plurality of neural network processors, and each neural network processor may be capable of performing distributed training within the processing node. The neural network computation circuitry 1004 can perform forward propagation operations and backward propagation operations, as discussed with reference to FIG. 1. The neural network computation circuitry 1004 can generate a set of weight gradients for a neural network layer, which can be sent to the collective parameter serving engine 1002 to manage the exchange operation of the set of weight gradients. As part of the exchange operation, the collective parameter serving engine 1002 can forward one or more subsets of weight gradients to the communication interface 1006 for transmission to other processing nodes via a computer network, and receive one or more subsets of weight gradients computed by other processing nodes using the communication interface 1006.

In certain embodiments, the processing node may be configured to operate as an on-chip collective parameter server node to perform collective compute operations on a subset of weight gradients. For example, the collective parameter serving engine 1002 may be capable to perform certain collective compute operations on the processing node for gradient exchange, similar to a stand-alone collective compute parameter server. For example, the collective parameter serving engine 1002 may perform a scatter-reduce operation on a portion of the set of weight gradients generated by the neural network computation circuitry 1004 and other processing nodes to generate reduced weight gradients. The collective parameter serving engine 1002 may also be configured to perform an all-gather operation on the reduced weight gradients to generate updated weight gradients that can be used by the neural network computation circuitry 1004. The collective parameter serving engine 1002 may include software or hardware components. In certain embodiments, the collective parameter serving engine 1002 may be part of the neural network computation circuitry 1004.

In some implementations, the collective parameter serving engine 1002 may collect subsets of the weight gradients from other processing nodes via the communication interface 1006. The collective parameter serving engine 1002 can perform accumulation, sum, mean, average, partition, and other relevant operations to compute the updated weight gradients. In certain embodiments, the collective parameter serving engine 1002 may also compute updated weight values 1014 using the updated weight gradients, to be used by the neural network computation circuitry 1004. The updated weight values 1014 can be used for a next iteration of the training process, or can be the final weight values to be used for inference operations.

The communication interface 1006 may be configured to provide an interface for transmitting and receiving data and control signals. The communication interface 1006 may include an internode communication interface to enable communication with other processing nodes in the distributed neural network training system. For example, the communication interface 1006 may include a PCIe or another suitable interface. In certain embodiments, the communication interface 1006 may include a network interface to communicate with other processing nodes over a network.

In some implementations, the collective parameter serving engine 1002 may receive a set of weight gradients 1008 computed by neural network computation circuitry 1004 for a first pass of the training process of a neural network. To perform a scatter-reduce operation for a dimension of the N-dimensions of the hyper-rectangle, the collective parameter serving engine 1002 may split the set of weight gradients 1008 into P subsets that is equal to a number of processing nodes on a same edge of the dimension. The collective parameter serving engine 1002 may transmit a respective subset of the P subsets to each processing node of (P−1) processing nodes on the same edge of the dimension. For example, the collective parameter serving engine 1002 may transmit via the communication interface 1006 a respective subset of the set of weight gradients 1008 to each processing node that is on the same edge of the dimension. In certain examples, the collective parameter serving engine 1002 may transmit a first subset along a slower link to a first processing node before transmitting a second subset along a faster link to a second processing node. The collective parameter serving engine 1002 may collect a respective subset, corresponding to a remaining subset of the P subsets, from each of the (P−1) processing nodes on the same edge of the dimension. For example, one of the subsets of the respective set of weight gradients computed by each processing node that is on the same edge of the dimension can be received via the communication interface 1006.

The collective parameter serving engine 1002 may perform a reduce operation on the remaining subset of the P subsets and the collected respective subsets from the (P−1) processing nodes on the same edge of the dimension to generate the reduced weight gradients. The reduce operation may include performing a sum, mean, average, or another function. The scatter-reduce operation can be performed by the collective parameter serving engine 1002 according to a sequence of dimensions for each of the N-dimensions that the processing node is part of. The reduced weight gradients for each dimension may be successively reduced by a factor of a number of processing nodes on a same edge of a corresponding dimension.

In some implementations, the collective parameter serving engine 1002 may perform the all-gather operation for a dimension by transmitting via the communication interface 1006 the reduced weight gradients to the processing nodes on the same edge of the dimension, and collecting via the communication interface 1006 respective reduced weight gradients from the processing nodes on the same edge of the dimension to generate updated weight gradients. In certain examples, the collective parameter serving engine 1002 may transmit the reduced weight gradients along a slower link to a first processing node before transmitting the reduced weight gradients along a faster link to a second processing node. The collective parameter serving engine 1002 may use the updated weight gradients to update the weights and provide the updated weights 1014 to the neural network computation circuitry 1004.

Figure 11:
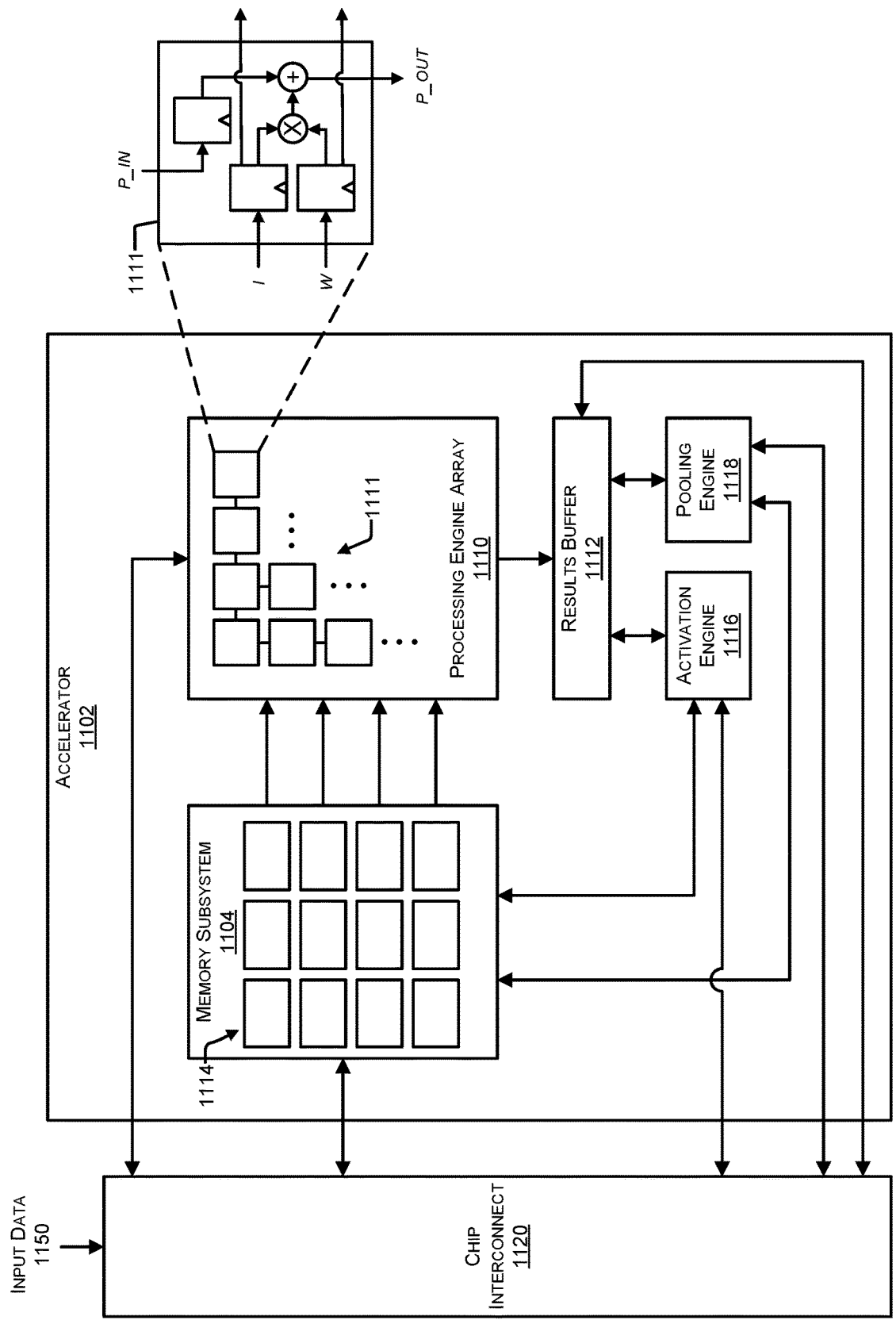
FIG. 11 is a block diagram illustrating an example of an integrated circuit device.

FIG. 11 is a block diagram illustrating an example of an integrated circuit device that can be used to perform a training process of a neural network, in certain embodiments. The example of FIG. 11 illustrates an accelerator 1102. For example, the accelerator 1102 can be part of the neural network computation circuitry 1004. The accelerator 1102 may be configured to generate the set of weight gradients 1008 for each pass of the training process. In various examples, the accelerator 1102, for a set of input data (e.g., input data 1150), can execute computations using a processing engine array 1110, an activation engine 1116, and/or a pooling engine 1118. In some examples, the example accelerator 1102 may be an integrated circuit component of a processor, such as a neural network processor. The processor may have other integrated circuit components, including additional accelerator engines.

In various implementations, the memory subsystem 1104 can include multiple memory banks 1114. In these implementations, each memory bank 1114 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1114. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1104 can permit simultaneous access to the read or write channels of multiple memory banks. As another example, the memory subsystem 1104 can include arbitration logic such that arbitration between, for example, the outputs of multiple memory banks 1114 can result in more than one memory bank's output being used. In these and other examples, though globally managed by the memory subsystem 1104, each memory bank can be operated independently of any other.

Having the memory banks 1114 be independently accessible can increase the efficiency of the accelerator 1102. For example, values can be simultaneously read and provided to each row of the processing engine array 1110, so that the entire processing engine array 1110 can be in use in one clock cycle. As another example, the memory banks 1114 can be read at the same time that results computed by the processing engine array 1110 are written to the memory subsystem 1104. In contrast, a single memory may be able to service only one read or write at a time. With a single memory, multiple clock cycles can be required, for example, to read input data for each row of the processing engine array 1110 before the processing engine array 1110 can be started.

In various implementations, the memory subsystem 1104 can be configured to simultaneously service multiple clients, including the processing engine array 1110, the activation engine 1116, the pooling engine 1118, and any external clients that access the memory subsystem 1104 over a communication fabric 1120. In some implementations, being able to service multiple clients can mean that the memory subsystem 1104 has at least as many memory banks as there are clients. In some cases, each row of the processing engine array 1110 can count as a separate client. In some cases, each column of the processing engine array 1110 can output a result, such that each column can count as a separate write client. In some cases, output from the processing engine array 1110 can be written into the memory banks 1114 that can then subsequently provide input data for the processing engine array 1110. As another example, the activation engine 1116 and the pooling engine 1118 can include multiple execution channels, each of which can be separate memory clients. The memory banks 1114 can be implemented, for example, using static random access memory (SRAM).

In various implementations, the memory subsystem 1104 can include control logic. The control logic can, for example, keep track of the address spaces of each of the memory banks 1114, identify memory banks 1114 to read from or write to, and/or move data between the memory banks 1114. In some implementations, memory banks 1114 can be hardwired to particular clients. For example, a set of memory banks 1114 can be hardwired to provide values to the rows of the processing engine array 1110, with one memory bank servicing each row. As another example, a set of memory banks can be hard wired to receive values from columns of the processing engine array 1110, with one memory bank receiving data for each column.

The processing engine array 1110 is the computation matrix of the example accelerator 1102. The processing engine array 1110 can, for example, execute parallel integration, convolution, correlation, and/or matrix multiplication, among other things. The processing engine array 1110 includes multiple processing engines 1111, arranged in rows and columns, such that results output by one processing engine 1111 can be input directly into another processing engine 1111. Processing engines 1111 that are not on the outside edges of the processing engine array 1110 thus can receive data to operate on from other processing engines 1111, rather than from the memory subsystem 1104.

In various examples, the processing engine array 1110 uses systolic execution, in which data arrives at each processing engine 1111 from different directions at regular intervals. In some examples, input data can flow into the processing engine array 1110 from the left and weight values can be loaded at the top. In some examples weights and input data can flow from the left and partial sums can flow from top to bottom. In these and other examples, a multiply-and-accumulate operation moves through the processing engine array 1110 as a diagonal wave front, with data moving to the right and down across the array. Control signals can be input at the left at the same time as weights, and can flow across and down along with the computation.

In various implementations, the number of columns in the processing engine array 1110 determines the computational capacity of the processing engine array 1110, and the number of rows determines the required memory bandwidth for achieving maximum utilization of the processing engine array 1110. The processing engine array 1110 can have, for example, 64 columns and 428 rows, or some other number of columns and rows.

An example of a processing engine 1111 is illustrated in FIG. 11 in an inset diagram. As illustrated by this example, a processing engine 1111 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1111.

In the illustrated example, an input from above can include a partial sum, p_in, provided either from another processing engine 1111 or from a previous round of computation by the processing engine array 1110. When starting a computation for a new set of input data, the top row of the processing engine array 1110 can receive a fixed value for p_in, such as zero. As illustrated by this example, i and w are multiplied together and the result is summed with p_in to produce a new partial sum, p_out, which can be input into another processing engine 1111. Various other implementations of the processing engine 1111 are possible.

Outputs from the last row in the processing engine array 1110 can be temporarily stored in the results buffer 1112. The results can be intermediate results, which can be written to the memory banks 1114 to be provided to the processing engine array 1110 for additional computation. Alternatively, the results can be final results, which, once written to the memory banks 1114 can be read from the memory subsystem 1104 over the communication fabric 1120, to be output by the system.

In some implementations, the accelerator 1102 includes an activation engine 1116. In these implementations, the activation engine 1116 can combine the results from the processing engine array 1110 into one or more output activations. For example, for a convolutional neural network, convolutions from multiple channels can be summed to produce an output activation for a single channel. In other examples, accumulating results from one or more columns in the processing engine array 1110 may be needed to produce an output activation for a single node in the neural network. In some examples, activation engine 1116 can be bypassed.

In various examples, the activation engine 1116 can include multiple separate execution channels. In these examples, the execution channels can correspond to the columns of the processing engine array 1110, and can perform an operation on the outputs of a column, the result of which can be stored in the memory subsystem 1104. In these examples, the activation engine 1116 may be able to perform between 1 and n parallel computations, where n is equal to the number of columns in the processing engine array 1110. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1102 can include a pooling engine 1118. Pooling is the combining of outputs of the columns of the processing engine array 1110. Combining can include for example, computing a maximum value, a minimum value, an average value, a median value, a summation, a multiplication, or another logical or mathematical combination. In various examples, the pooling engine 1118 can include multiple execution channels that can operating on values from corresponding columns of the processing engine array 1110. In these examples, the pooling engine 1118 may be able to perform between 1 and n parallel computations, where n is equal to the number of columns in the processing engine array 1110. In various examples, execution channels of the pooling engine 1118 can operate in parallel and/or simultaneously. In some examples, the pooling engine 1118 can be bypassed.

Herein, the activation engine 1116 and the pooling engine 1118 may be referred to collectively as execution engines. The processing engine array 1110 is another example of an execution engine. Another example of an execution engine is a Direct Memory Access (DMA) engine, which may be located outside the accelerator 1102.

Input data 1150 can arrive over the communication fabric 1120. The communication fabric 1120 can connect the accelerator 1102 to other components of a processor, such as a DMA engine that can obtain input data 1150 from an Input/Output (I/O) device, a storage drive, or a network interface. The input data 1150 can be, for example one-dimensional data, such as a character string or numerical sequence, or two-dimensional data, such as an array of pixel values for an image or frequency and amplitude values over time for an audio signal. In some examples, the input data 1150 can be three-dimensional, as may be the case with, for example, the situational information used by a self-driving car or virtual reality data. In some implementations, the memory subsystem 1104 can include a separate buffer for the input data 1150. In some implementations, the input data 1150 can be stored in the memory banks 1114 when the accelerator 1102 receives the input data 1150.

In some examples, the accelerator 1102 can be used for training a neural network model by performing forward propagations and backward propagations for different layers. For example, the input data 1150 may include a portion of the training input data, as described with reference to FIG. 1. In some examples, the accelerator 1102 can implement a neural network processing engine. In these examples, the accelerator 1102, for a set of input data 1150, can execute a neural network to perform a task for which the neural network was trained. Executing a neural network on a set of input data can be referred to as inference or performing inference.

The weights for the neural network can be stored in the memory subsystem 1104, along with input data 1150 on which the neural network will operate. The neural network can also include instructions, which can program the processing engine array 1110 to perform various computations on the weights and the input data. The instructions can also be stored in the memory subsystem 1104, in the memory banks 1114 or in a separate instruction buffer. The processing engine array 1110 can output intermediate results, which represent the outputs of individual layers of the neural network. In some cases, the activation engine 1116 and/or pooling engine 1118 may be enabled for computations called for by certain layers of the neural network. The accelerator 1102 can store the intermediate results in the memory subsystem 1104 for inputting into the processing engine array 1110 to compute results for the next layer of the neural network. The processing engine array 1110 can further output final results from a last layer of the neural network. The final results can be stored in the memory subsystem 1104 and then be copied out to host processor memory or to another location. In certain embodiments, the accelerator 1102 may generate a set of weight gradients which can be sent to the collective parameter serving engine 1002 via the chip interconnect 1120. In certain examples, the input data 1150 may include updated weights calculated by the parameter serving engine 1002, which can be used by the accelerator 1102 for the training process.

Figure 12:
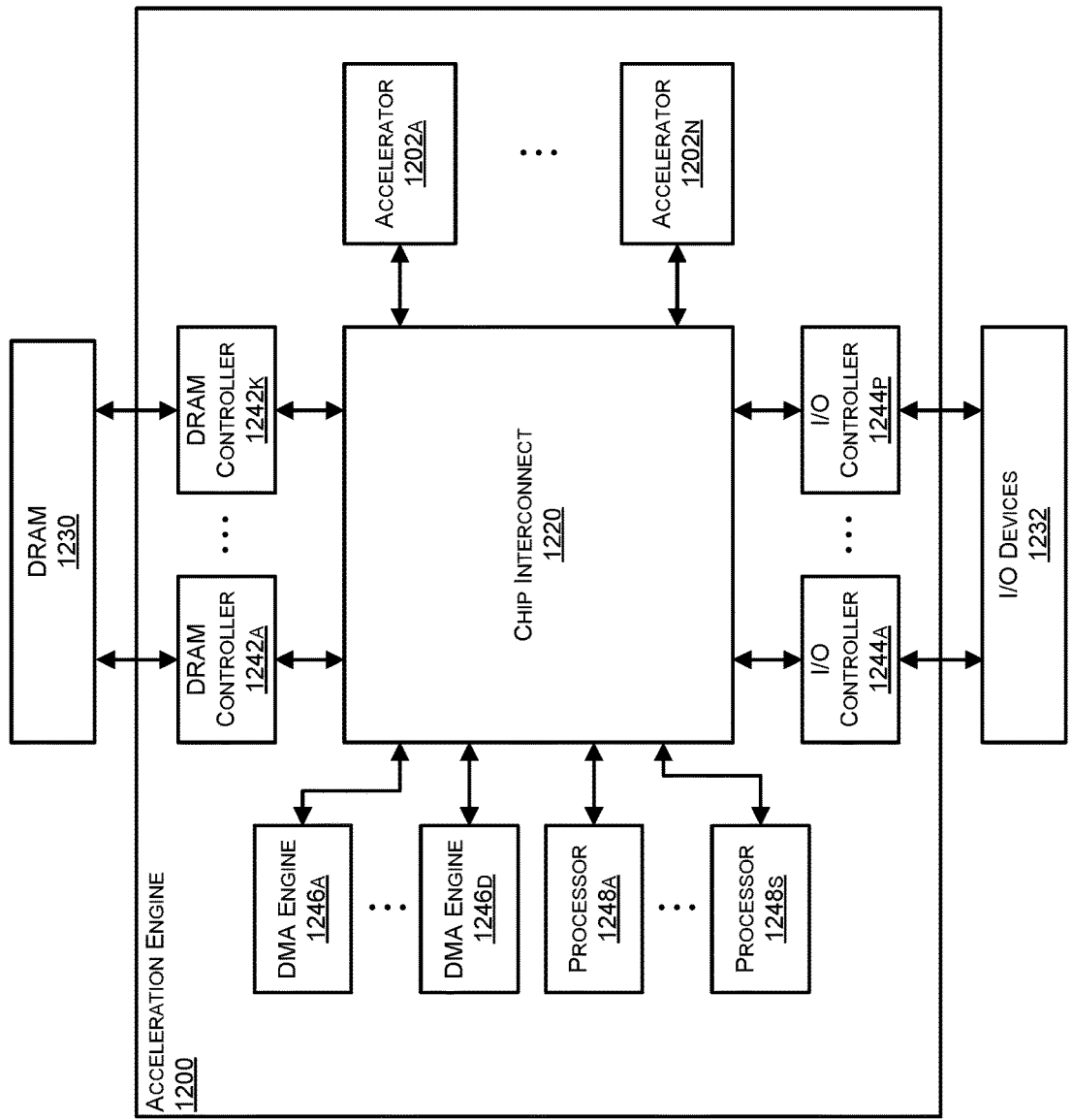
FIG. 12 includes a block diagram that illustrates an example of an acceleration engine.

FIG. 12 includes a block diagram that illustrates an example of an acceleration engine 1200. The acceleration engine 1200 is an example of an integrated circuit that can include one or more accelerators 1202a-1202n that may be similar to the accelerator illustrated in FIG. 11.

In the example of FIG. 12, the acceleration engine 1200 includes multiple accelerators 1202a-1202n, each of which can perform a set of operations. In various examples, the accelerators 1202a-1202n are for particular types of operations, so that the accelerators 1202a-1202n can perform the operations much faster than when similar operations are performed by a general purpose processor. In various examples, to perform a set of operations, input data on which the operations are to be performed must first be moved into the accelerators 1202a-1202n. Additionally, in some cases, program code is also moved into the accelerators 1202a-1202n, which programs the operations that the accelerators 1202a-1202n will perform on the data. In the illustrated example, the acceleration engine 1200 includes n accelerators 1202a-1202n. Examples of accelerators that can be included in the acceleration engine 1200 include graphics accelerators, floating point accelerators, neural network accelerators, and others. In various examples, the accelerators 1202a-1202n can each be the same (e.g., each of the is a graphics accelerator) or can be different (e.g., the accelerators 1202a-1202n include a graphics accelerator, a floating point accelerator, and neural network accelerator).

The example acceleration engine 1200 further includes DRAM controllers 1242a-1242k for communicating with an external memory. The external memory is implemented, in this example, using DRAM 1230. In the illustrated example, the acceleration engine 1200 includes k DRAM controllers 1242a-1242k, each of which may be able to communicate with an independent set of banks of DRAM. In other examples, other types of RAM technology can be used for the external memory. The DRAM controllers 1242a-1242k can also be referred to as memory controllers.

In various examples, input data and/or program code for the accelerators 1202a-1202n can be stored in the DRAM 1230. Different programs can cause the accelerators 1202a-1202n to perform different operations. For example, when one of the accelerators is a neural network accelerator, one program can configure the neural network accelerator to perform speech recognition while another program can configure the neural network accelerator to perform image recognition. In various examples, different accelerators 1202a-1202n can be programmed with different programs, so that each performs a different set of operations. In various examples, the processors 1248a-1248s can manage moving of program code from the DRAM 1230 to the accelerators 1202a-1202n.

The example acceleration engine 1200 further includes I/O controllers 1244a-1244p for communicating with I/O devices 1232 in the system. The acceleration engine 1200 can communicate with I/O devices over, for example, a processor bus. In some examples, the processor bus can be implemented using Peripheral Component Interconnect (PCI) and/or a variation of the PCI bus protocol. The processor bus can connect the acceleration engine 1200 to I/O devices such as, for example, input and output devices, memory controllers, storage devices, and/or network interface cards, among other things. In some examples, the I/O controllers 1244-1244p can enable the acceleration engine 1200 to act as an I/O device for a host processor. For example, the acceleration engine 1200 can be the recipient of input data from the host processor, and a command indicating an operation to be performed on the input data (e.g., a particular computation or analysis). In the illustrated example, the acceleration engine 1200 includes p I/O controllers 1244a-1244p, each of which may include a separate root complex and may communicate with a separate set of I/O devices 1232. In other examples, other standardized bus protocols, such as Ultra Path Interconnect (UPI) can be used for the host bus. In other examples, a proprietary bus protocol can be used.

Movement of data in the acceleration engine 1200 can be managed by one or more processors 1248a-1248s, which can also be referred to as data management processors. In the example of FIG. 12, the acceleration engine 1200 includes s processors 1248a-1248s incorporated into the device (e.g., on the same silicon die). In other examples, the processors 1248a-1248s can be external to the acceleration engine 1200 (e.g., on a different die and/or in a different package). In some examples, the processors 1248a-1248s can manage the movement of data from I/O devices 1232 to the accelerators 1202a-1202n or the DRAM 1230. For example, input data may be located at an I/O device 1232 or in processor memory, and the processors 1248a-1248s can move the input from the I/O device 1232 or processor memory into an accelerator or into DRAM 1230. As another example, program code for the accelerators 1202a-1202n may be located on an I/O device 1232 or in processor memory.

The example acceleration engine 1200 further includes DMA engines 1246a-1246d that can move data between the accelerators 1202a-1202n, DRAM controllers 1242a-1242k, and I/O controllers 1244a-1244p. In the illustrated example, the acceleration engine 1200 includes d DMA engines 1246a-1246d. In some implementations, the DMA engines 1246a-1246d can be assigned to specific tasks, such as moving data from the DRAM controllers 1242a-1242d to the accelerators 1202a-1202n, or moving data between the I/O controllers 1244a-1244p and the accelerators 1202a-1202n. These tasks can be assigned, for example, by enqueueing descriptors with the DMA engines 1246a-1246d, where a descriptor identifies an address for a block of data and an operation (e.g., a read or a write) to perform. A descriptor, for example, can direct a DMA engine to instruct a DMA controller to read a block of data from DRAM 1230. A descriptor can, as a further example, instruct the DMA engine to write data, read by the DMA controller, to an accelerator. Further descriptors can be used to move data from an accelerator to DRAM 1230.

In various examples, each of the processors 1248a-1248s can be responsible for managing the data movement for a different accelerator. In some examples, a processor may manage the data movement for more than one accelerator. Similarly, in various examples, each of the processors 1248a-1248s can be assigned to one or more DMA engines 1246a-1246d. In these and other examples, associations between processors 1248a-1248s, accelerators 1202a-1202n, and DMA engines 1246a-1246d are determined by program code being executed by each respective processor.

In certain embodiments, one or more processing nodes (e.g., the computing device 1000) can be part of the acceleration engine 1200. For example, the neural network computation circuitry 1004 may be part of the accelerators 1202a-1202n and the collective parameter serving engine 1002 can be part of the 1248a-1248s or the DMA engines 1246a-1246d. Some of the processing nodes can communicate via a chip interconnect 1220.

In the example acceleration engine 1200, the various components can communicate over the chip interconnect 1220. The chip interconnect 1220 primarily includes wiring for routing data between the components of the acceleration engine 1200. In some cases, the chip interconnect 1220 can include a minimal amount of logic, such as multiplexors to control the direction of data, flip-flops for handling clock domain crossings, and timing logic.

Figure 13:
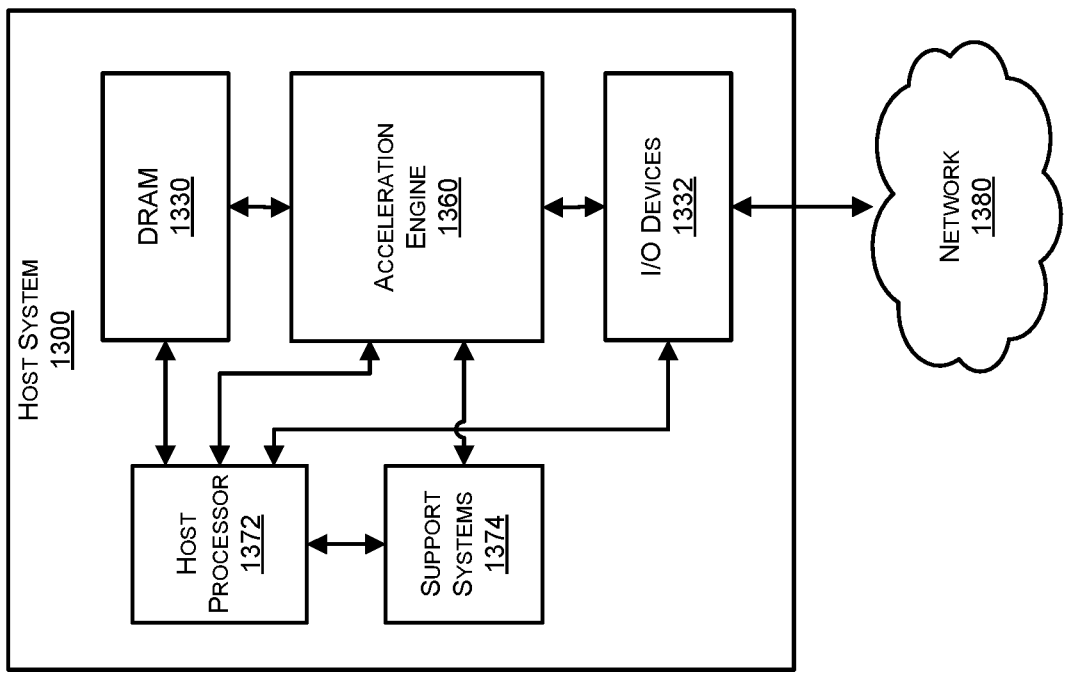
FIG. 13 includes a block diagram that illustrates an example of a host system.

FIG. 13 includes a block diagram that illustrates an example of a host system 1300 in which an acceleration engine 1360 can be used. The acceleration engine 1360 of FIG. 13 is an example of a device that can include one or more accelerators such as is illustrated in FIG. 12. The example host system 1300 of FIG. 13 includes the acceleration engine 1360, a host processor 1372, DRAM 1330 or processor memory, I/O devices 1332, and support systems 1374. In various implementations, the host system 1300 can include other hardware that is not illustrated here.

The host processor 1372 is a general purpose integrated circuit that is capable of executing program instructions. In some examples, the host processor 1372 can include multiple processing cores. A multi-core processor may include multiple processing units within the same processor. In some examples, the host system 1300 can include more than one host processor 1372. In some examples, the host processor 1372 and the acceleration engine 1360 can be one chip, such as, one or more integrated circuits within the same package.

In various examples, the host processor 1372 can communicate with other components in the host system 1300 over one or more communication channels. For example, the host system 1300 can include a host processor bus, which the host processor 1372 can use to communicate with the DRAM 1330, for example. As another example, the host system 1300 can include an I/O bus, such as a PCI-based bus, over which the host processor 1372 can communicate with the acceleration engine 1360 and/or the I/O devices 1332, for example. In various examples, the host system 1300 can, alternatively or additionally, include other communication channels or busses, such as serial busses, power management busses, storage device busses, and so on.

In some examples, software programs executing on the host processor 1372 can receive or generate input for processing by the acceleration engine 1360. In some examples, the programs can select an appropriate neural network to execute for a given input. For example, a program may be for language translation, and can select one or more neural networks capable of speech recognition and/or machine translation. In these and other examples, the programs can configure the acceleration engine 1360 with the neural network to execute, and/or can select a neural network processing engine on the acceleration engine 1360 that has previously been configured to execute the desired neural network. In some examples, once the acceleration engine 1360 has started an inference on input data, the host processor 1372 can manage the movement of data (such as weights, instructions, intermediate results, results of conditional layers, and/or final results) into or out of the acceleration engine 1360.

In some examples, the program can select a neural network to train for a specific task, e.g., object recognition, speech recognition. In these examples, the host processor 1372 may receive a request to configure the acceleration engine 1360 perform a training process of the neural network. The host processor 1372 can configure the processing nodes of the acceleration engine 1360 as a hyper-rectangle with N-dimensions. Once the training process has started, the host processor 1372 can manage movement of data for the gradient exchange process among the processing nodes.

In some examples, a software program that is using the acceleration engine 1360 to conduct an inference can read the result from a conditional layer from the acceleration engine 1360 and/or from a storage location, such as in DRAM 1330. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software. In some examples, the software program can initiate and manage the training process of the neural network.

The DRAM 1330 is memory that is used by the host processor 1372 for storage of program code that the host processor 1372 is in the process of executing, as well as values that are being operated on. In some examples, the data for a neural network (e.g., weight values, instructions, and other data) can be all or partially stored in the DRAM 1330. DRAM is a common term for processor memory, and though DRAM is volatile memory, processor memory can be volatile and/or non-volatile. Though not illustrated here, the host system 1300 can include other volatile and non-volatile memories for other purposes. For example, the host system 1300 can include a Read-Only Memory (ROM) that stores boot code for booting the host system 1300 at power on, and/or Basic Input/Output System (BIOS) code.

Though not illustrated here, the DRAM 1330 can store instructions for various programs, which can be loaded into and be executed by the host processor 1372. For example, the DRAM 1330 can be storing instructions for an operating system, one or more data stores, one or more application programs, one or more drivers, and/or services for implementing the features disclosed herein.

The operating system can manage and orchestrate the overall operation of the host system 1300, such as scheduling tasks, executing applications, and/or controller peripheral devices, among other operations. In some examples, a host system 1300 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1300. For example, some drivers can provide communication between the operating system and peripheral devices or I/O devices 1332. Alternatively or additionally, some drivers may provide communication between application programs and the operating system, and/or application programs and peripheral devices accessible to the host system 1300. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1332 can include hardware for connecting to user input and output devices, such as keyboards, mice, pens, tablets, voice input devices, touch input devices, displays or monitors, speakers, and printers, among other devices. The I/O devices 1332 can also include storage drives and/or network interfaces for connecting to a network 1380. For example, the host system 1300 can use a network interface to communicate with storage devices, user terminals, other computing devices or servers, and/or other networks, among various examples. In certain embodiments, the host system 1300 may be part of a distributed neural network training system, which can be used to perform training of neural networks. Some of the processing nodes of the distributed neural network training system can be part of the acceleration engine 1360, and some others can be part of another system in the distributed neural network training system coupled to the host system 1300 via the network 1380.

In various examples, one or more of the I/O devices 1332 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1300 or may be in an external enclosure. A storage device can be fixed (e.g., attached by screws) or removable (e.g., having a physical release mechanism and possibly a hot-plug mechanism).

Storage devices, the DRAM 1330, and any other memory component in the host system 1300 are examples of computer-readable storage media. Computer-readable storage media are physical mediums that are capable of storing data in a format that can be read by a device such as the host processor 1372. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1332 can be PCI-based devices. In these examples, a PCI-based I/O device includes a PCI interface for communicating with the host system 1300. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1374 can include hardware for coordinating the operations of the acceleration engine 1360. For example, the support systems 1374 can include a microprocessor that coordinates the activities of the acceleration engine 1360, including moving data around on the acceleration engine 1360. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1372. In some examples, the program executed by the microprocessor is stored on the hardware of microprocessor, or on a non-volatile memory chip in the host system 1300. In some examples, the microprocessor and the acceleration engine 1360 can be on chip, such as one integrated circuit on the same die and in the same package.

In some examples, the support systems 1374 can be responsible for taking instructions from the host processor 1372 when programs executing on the host processor 1372 request the execution of a neural network. For example, the host processor 1372 can provide the support systems 1374 with a set of input data and a task that is to be performed on the set of input data. In this example, the support systems 1374 can identify a neural network that can perform the task, and can program the acceleration engine 1360 to execute the neural network on the set of input data. In some examples, the support systems 1374 only needs to select an appropriate neural network processing engine of the neural network processor. In some examples, the support systems 1374 may need to load the data for the neural network onto the acceleration engine 1360 before the acceleration engine 1360 can start executing the neural network. In these and other examples, the support systems 1374 can further receive the output of executing the neural network, and provide the output back to the host processor 1372.

In some examples, the operations of the support systems 1374 can be handled by the host processor 1372. In these examples, the support systems 1374 may not be needed and can be omitted from the host system 1300.

In various examples, the host system 1300 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1300 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

FIG. 14 illustrates a flow chart 1400 illustrating an example of a method for configuring M number of processing nodes of a distributed computing system to perform data exchange operations, according to certain embodiments.

In certain examples, the computing system can be used as a neural network training system and the data exchange operations may correspond to the gradient exchange operations for a training process of a neural network. For example, in certain embodiments, the method may be executed by the host processor 1372 of FIG. 13. The host processor 1372 may receive a request to configure M processing nodes of a distributed neural network training system. In certain example, the host system 1300 may be part of the distributed neural network training system. The M processing nodes can be part of the acceleration engine 1360. In certain examples, some of the M processing nodes may be on a different system coupled to the host system 1300 via the network 1380.

At step 1402, the method includes determining N numeric factors based on the M number of processing nodes. In certain examples, the N numeric factors can be N prime factors of M. In other examples, M can be a prime number, and the N numeric factors can be numeric factors of a non-prime number greater than M. In certain examples, when M is a prime number, one or more additional processing nodes or stand-alone collective compute parameter servers can be added in the network, which can allow balancing the overall bandwidth of the network at a minimal incremental cost. The N numeric factors can be determined based on the physical topology supported by the distributed neural network training system. For example, the physical topology may include available communication links, bandwidth and/or speed supported by each communication link, or available hardware configuration. One or more processing nodes can be assigned to an edge or a dimension of the hyper-rectangle to optimize the network or connectivity characteristics, which may include bandwidth supported by each communication link, latency of each communication link, and the network topology.

At step 1404, the method includes configuring the M number of processing nodes as a network represented as a hyper-rectangle with N dimensions. A number of processing nodes in each of the N dimensions may correspond to one of the N numeric factors. The configuration of the M processing nodes may include determining the number of dimensions of the hyper-rectangle, number of edges in each dimension, and number of processing nodes on each edge. For example, the host processor 1372 may configure the M number of processing nodes as a network represented as a hyper-rectangle with N dimensions. The number of processing nodes in each of the N dimensions may correspond to one of the N numeric factors. For example, as discussed with reference to FIG. 9A, 18 processing nodes can be configured as the hyper-rectangle 902 with 3 processing nodes in a first dimension and 6 processing nodes in a second dimension.

In certain examples, the host processor 1372 may reconfigure the hyper-rectangle based on one or more of a node limit, network topology, bandwidth of each link in the network, latency of each link in the network, or network characteristics. For example, the host processor 1372 may determine whether two or more dimensions of the hyper-rectangle are collapsible into one dimension. As discussed with reference to FIGS. 9A-9D, different optimization techniques may be used for placement of the processing nodes on different edges and dimensions based on network or connectivity characteristics. For example, placement of the processing nodes on different edges can be determined based on availability of communication links, and/or different bandwidth and speed supported by each link.

At step 1406, the method includes initiating each processing node in the M number of processing nodes to compute a set of data to be exchanged. As an example, the host processor 1372 may initiate the M processing nodes to perform a training process. Each processing node may compute a set of weight gradients as part of the training process. As an example, the processing node can be the computing device 1000 in FIG. 10, and the set of weight gradients may be computed by the neural network computation circuitry 1004. In certain examples, the method may further include configuring each processing node to operate as an on-chip collective parameter server node to perform collective compute operations on a portion of a respective set of weight gradients.

At step 1408, the method includes triggering a data exchange operation to exchange respective sets of data among the M number of processing nodes. The data exchange process can be performed based on the algorithm described with reference to FIG. 5. For example, the host processor 1372 can trigger a gradient exchange process to exchange respective weight gradients among the M number of processing nodes by performing a scatter reduce operation and an all-gather operation as discussed with reference to FIGS. 6A-6C and FIGS. 7A-7E. The scatter-reduce operation can be performed according to a sequence of the N dimensions, and the all-gather operation can be performed in a reverse order of the sequence of the N dimensions. In certain examples, the sequence of dimensions may include an order of the dimensions to utilize higher bandwidth between the collective parameter server nodes for earlier dimensions than for later dimensions.

FIG. 15 illustrates a flow chart 1500 for a computer-implemented method for distributed training in a system of processing nodes configured as a hyper-rectangle network of N-dimensions, according to certain embodiments. The method can be performed by a processing node of a plurality of processing nodes based on the algorithm described with reference to FIG. 5. The plurality of processing nodes may be configured as a hyper-rectangle network of N-dimensions. For example, the system of processing nodes may include 6 processing nodes configured as a 2×3 hyper-rectangle discussed with reference to FIGS. 7A-7F.

At step 1502, the method may include performing, by a processing node of the processing nodes, a first pass of a training process of a neural network to compute a set of weight gradients. As an example, the processing node can be the computing device 1000 in FIG. 10, which can be part of the acceleration engine 1360 in FIG. 13. In certain examples, the processing node may include one or more neural network processors. As discussed with reference to FIG. 1, the processing node may perform a first pass of a training process using forward and backward propagations on a portion of the training input data to generate the set of weight gradients (e.g., dW1, dW2, or dWn). As an example, the processing node can be the first processing node 702 in FIGS. 7A-7F and the set of weight gradients may include 12 elements.

At step 1504, the method may include performing by the processing node, for each of the N-dimensions that the processing node is part of, a scatter-reduce operation, according to a sequence of dimensions, on the set of weight gradients with processing nodes that are on a same edge of a corresponding dimension to generate reduced weight gradients. For example, as shown in FIG. 7A, the first processing node 702 can be part of a first dimension (y-dimension) and a second dimension (x-dimension) of the 2-dimensions (N=2) of the hyper-rectangle. Performing the scatter-reduce operation for a dimension may include splitting the set of weight gradients into P subsets, where P equals the number of processing nodes on the same edge of the dimension. Performing the scatter-reduce operation for the dimension may further include transmitting a respective subset of the P subsets to each processing node of (P−1) processing nodes on the same edge of the dimension, and collecting a respective subset corresponding to a remaining subset of the P subsets from each of the (P−1) processing nodes on the same edge of the dimension. Performing the scatter-reduce operation for the dimension may further include performing a reduce operation on the remaining subset of the P subsets and the collected respective subsets from the (P−1) processing nodes on the same edge of the dimension to generate the reduced weight gradients.

For example, for the first dimension, P equals 2 corresponding to the first processing node 702 and the fourth processing node 708 on the same edge of the y-dimension. As shown in FIG. 7A, the set of weight gradients for the first processing node 702 may include $A_1$, $B_1$, $C_1$, $D_1$, $E_1$, and $F_1$, and the set of weight gradients for the fourth processing node 708 may include $A_4$, $B_4$, $C_4$, $D_4$, $E_4$, and $F_4$. The first processing node 702 can split the set of weight gradients into a first subset $A_1$, $B_1$, $C_1$ and a second subset $D_1$, $E_1$, $F_1$. Similarly, the fourth processing node 708 can split the set of weight gradients into a first subset $A_4$, $B_4$, $C_4$ and a second subset $D_4$, $E_4$, $F_4$.

The first processing node 702 may transmit the first subset $A_1$, $B_1$, $C_1$ of the 2 subsets to the fourth processing node 708, and collect the second subset $D_4$, $E_4$, $F_4$ from the fourth processing node 708. The first processing node 702 can now perform the reduce operation on the remaining second subset $D_1$, $E_1$, $F_1$ of the first processing node 702 and the collected second subset $D_4$, $E_4$, $F_4$ from the fourth processing node 708 to generate the reduced weight gradients $D_{4,1}$, $E_{4,1}$, $F_{4,1}$. For example, the reduce operation may include performing an average, mean, or sum operations on the subsets D1, $E_1$, $F_1$ and $D_4$, $E_4$, $F_4$ to generate the reduced weight gradients $D_{4,1}$, $E_{4,1}$, $F_{4,1}$.

The reduced weight gradients $D_{4,1}$, $E_{4,1}$, $F_{4,1}$ may represent the reduced set of weight gradients for the first processing node 702 for a first dimension of the N-dimensions. The reduced weight gradients generated by the processing node for a given dimension can be used as the set of weight gradients to be operated on for performing the scatter-reduce operation for a subsequent dimension in the sequence of dimensions. For example, the reduced weight gradients $D_{4,1}$, $E_{4,1}$, $F_{4,1}$ generated by the first processing node 702 for the y-dimension can be used as the set of weight gradients to be operated on for performing the scatter-reduce operation for the x-dimension.

For example, for the second dimension, P equals 3 corresponding to the first processing node 702, second processing node 704, and the third processing node 706 on the same edge of the x-dimension. The set of weight gradients to be operated on for performing the scatter-reduce operation may include the reduced weight gradients generated in the previous dimension. As shown in FIG. 7B, the set of weight gradients for the first processing node 702 may include $D_{4,1}$, $E_{4,1}$, $F_{4,1}$. The first processing node 702 can split $D_{4,1}$, $E_{4,1}$, $F_{4,1}$ into 3 subsets. A first subset may include $D_{4,1}$, a second subset may include $E_{4,1}$, and a third subset may include $F_{4,1}$.

The first processing node 702 may transmit the third subset $F_{4,1}$ of the 3 subsets to the third processing node 706, and the second subset $E_{4,1}$ of the 3 subsets to the second processing node 704. In certain examples, the first processing node 702 may transmit the third subset $F_{4,1}$ to the third processing node 706 before transmitting the second subset $E_{4,1}$ to the second processing node 704 if the link between the first processing node 702 and the second processing node 704 is slower than the link between the first processing node 702 and third processing node 706. The first processing node 702 may have the first subset $D_{4,1}$ of the 3 subsets remaining. The first processing node 702 may collect the second subset $D_{5,2}$ from the second processing node 704, and the third subset $D_{6,3}$ from the third processing node 706, corresponding to the remaining first subset $D_{4,1}$ of the first processing node 702. The first processing node 702 can now perform the reduce operation on the remaining first subset $D_{4,1}$ of the first processing node 702, the collected second subset $D_{5,2}$ from the second processing node 704, and the third subset $D_{6,3}$ from the third processing node 706 to generate the reduced weight gradients $D_{1,2,3,4,5,6}$. The reduced weight gradients $D_{1,2,3,4,5,6}$ may represent the reduced set of weight gradients for the first processing node 702 for a second dimension of the N-dimensions, as shown in FIG. 7C.

At step 1506, the method may further include performing by the processing node, for each of the N-dimensions that the processing node is part of, an all-gather operation in a reverse order of the sequence of dimensions on the reduced weight gradients with the processing nodes on the same edge of the corresponding dimension to generate updated weight gradients. Performing the all-gather operation for a dimension may include transmitting the reduced weight gradients to the processing nodes on the same edge of the dimension, and collecting respective reduced weight gradients from the processing nodes on the same edge of the dimension to generate the updated weight gradients.

The all-gather operation may be performed in the x-dimension first. For example, as shown in FIG. 7D, the first processing node 702 may transmit the reduced weight gradients $D_{1,2,3,4,5,6}$ to the second processing node 704 and the third processing node 706 that are on the same edge of the x-dimension. The first processing node 702 may also collect the reduced weight gradients $E_{1,2,3,4,5,6}$ from the second processing node 704 and the reduced weight gradients $F_{1,2,3,4,5,6}$ from the third processing node 706 to generate the updated weight gradients $D_{1,2,3,4,5,6}$, $E_{1,2,3,4,5,6}$, $F_{1,2,3,4,5,6}$.

Next, the all-gather operation may be performed in the y-dimension. For example, as shown in FIG. 7E, the first processing node 702 may transmit the updated weight gradients $D_{1,2,3,4,5,6}$, $E_{1,2,3,4,5,6}$, $F_{1,2,3,4,5,6}$ to the fourth processing node 708 that is on the same edge of the y-dimension. The first processing node 702 may also collect the updated weight gradients $A_{1,2,3,4,5,6}$, $B_{1,2,3,4,5,6}$, $C_{1,2,3,4,5,6}$ from the fourth processing node 708. Thus, the first processing node 702 may include the updated weight gradients $A_{1,2,3,4,5,6}$, $B_{1,2,3,4,5,6}$, $C_{1,2,3,4,5,6}$, $D_{1,2,3,4,5,6}$, $E_{1,2,3,4,5,6}$, $F_{1,2,3,4,5,6}$ after performing the all-gather operation in the y-dimension, as shown in FIG. 7F. Each processing node may have the same updated weight gradients $A_{1,2,3,4,5,6}$, $B_{1,2,3,4,5,6}$, $C_{1,2,3,4,5,6}$, $D_{1,2,3,4,5,6}$, $E_{1,2,3,4,5,6}$, $F_{1,2,3,4,5,6}$ after performing the scatter-reduce and all-gather operations as discussed with reference to FIGS. 7A-7F. The updated weight gradients can be used by each processing node for a next iteration of the training process.

The scatter-reduce operation, and the all-gather operations can be performed by each processing node using the collective parameter serving engine 1002 and the communication interface 1006 of the processing node. For example, the collective parameter serving engine 1002 may transmit the subsets to the other processing nodes and collect the subsets from the other processing nodes using the communication interface 1006.

Figure 16:
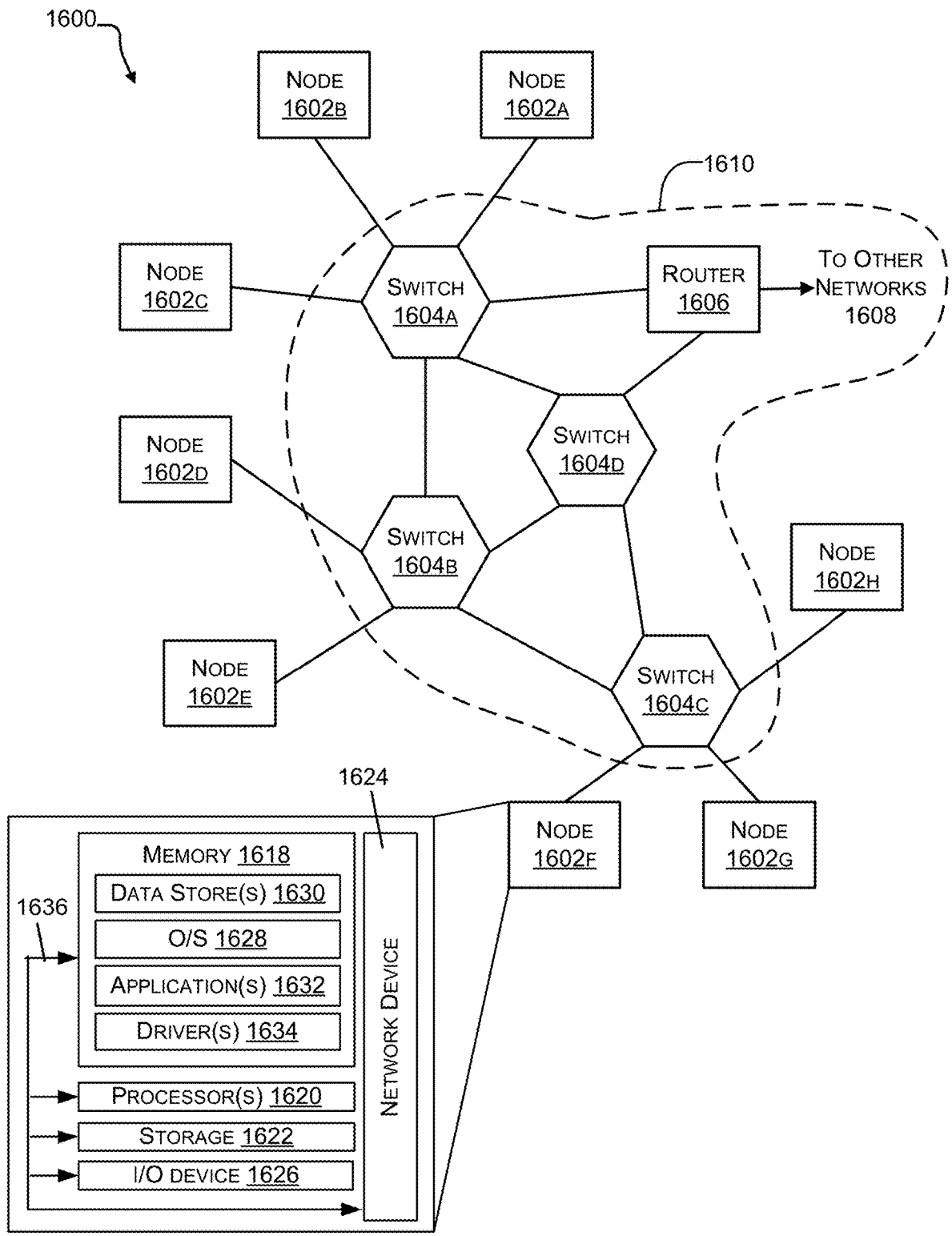
FIG. 16 includes a diagram of an example network.

FIG. 16 includes a diagram of an example network 1600, which can include one or more host systems, such as the host system illustrated in FIG. 13. For example, the example network 1600 of FIG. 16 includes multiple nodes 1602a-1602h, one or more of which can be a host system such as is illustrated in FIG. 13. Others of the nodes 1602a-1602h can be other computing devices, each of which include at least a memory for storing program instructions, a processor for executing the instructions, and a network interface for connecting to the network 1600.

In various examples, the network 1600 can be used to process data. For example, input data can be received at one of the nodes 1602a-1602h or from other networks 1608 with which the network 1600 can communicate. In this example, the input data can be directed to a node in the network 1600 that includes an acceleration engine, for the acceleration engine to operate on and produce a result. The result can then be transferred to the node or other network from which the input data was received. In various examples, input data can be accumulated from various sources, including one or more of the nodes 1602a-1602h and/or computing devices located in the other networks 1608, and the accumulated input data can be directed to one or more host systems in the network 1600. Results from the host systems can then be distributed back to the sources from which the input data was gathered.

In various examples, one or more of the nodes 1602a-1602h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 16, the nodes 1602a-1602h are connected to one another using a switched architecture with point-to point links. The switched architecture includes multiple switches 1604a-1604d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1604a-1604d of FIG. 16 may be connected to the nodes 1602a-1602h and provide multiple paths between any two nodes.

The network 1600 may also include one or more network devices for connection with other networks 1608, such as a router 1606. Routers use headers and forwarding tables to determine the best path for forwarding the packets, and use protocols such as internet control message protocol (ICMP) to communicate with each other and configure the best route between any two devices. The router 1606 of FIG. 16 can be used to connect to other networks 1608 such as subnets, LANs, wide area networks (WANs), and/or the Internet.

In some examples, network 1600 may include any one or a combination of many different types of networks, such as cable networks, the Internet, wireless networks, cellular networks and other private and/or public networks. The interconnected switches 1604a-1604d and the router 1606, if present, may be referred to as a switch fabric 1610, a fabric, a network fabric, or simply a network. In the context of a computer network, terms "fabric" and "network" may be used interchangeably herein.

The nodes 1602a-1602h may be any combination of host systems, processor nodes, storage subsystems, and I/O chassis that represent user devices, service provider computers or third party computers.

User devices may include computing devices to access an application 1632 (e.g., a web browser or mobile device application). In some aspects, the application 1632 may be hosted, managed, and/or provided by a computing resources service or service provider. The application 1632 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1608. Additionally, the user device(s) may be part of the distributed system managed by, controlled by, or otherwise part of the service provider computer(s) (e.g., a console device integrated with the service provider computers).

The node(s) of FIG. 16 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1632 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1602a-1602h may include at least one memory 1618 and one or more processing units (or processor(s) 1620). The processor(s) 1620 may be implemented in hardware, computer-executable instructions, firmware, or combinations thereof. Computer-executable instruction or firmware implementations of the processor(s) 1620 may include computer-executable or machine-executable instructions written in any suitable programming language to perform the various functions described.

In some instances, the hardware processor(s) 1620 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1618 may store program instructions that are loadable and executable on the processor(s) 1620, as well as data generated during the execution of these programs. Depending on the configuration and type of the node(s) 1602a-1602h, the memory 1618 may be volatile (such as RAM) and/or non-volatile (such as ROM, flash memory, etc.). The memory 1618 may include an operating system 1628, one or more data stores 1630, one or more application programs 1632, one or more drivers 1634, and/or services for implementing the features disclosed herein.

The operating system 1628 may support nodes 1602a-1602h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 1628 may also be a proprietary operating system.

The data stores 1630 may include permanent or transitory data used and/or operated on by the operating system 1628, application programs 1632, or drivers 1634. Examples of such data include web pages, video data, audio data, images, user data, and so on. The information in the data stores 1630 may, in some implementations, be provided over the network(s) 1608 to user devices. In some cases, the data stores 1630 may additionally or alternatively include stored application programs and/or drivers. Alternatively or additionally, the data stores 1630 may store standard and/or proprietary software libraries, and/or standard and/or proprietary application user interface (API) libraries. Information stored in the data stores 1630 may be machine-readable object code, source code, interpreted code, or intermediate code.

The drivers 1634 include programs that may provide communication between components in a node. For example, some drivers 1634 may provide communication between the operating system 1628 and additional storage 1622, network device 1624, and/or I/O device 1626. Alternatively or additionally, some drivers 1634 may provide communication between application programs 1632 and the operating system 1628, and/or application programs 1632 and peripheral devices accessible to the service provider computer. In many cases, the drivers 1634 may include drivers that provide well-understood functionality (e.g., printer drivers, display drivers, hard disk drivers, Solid State Device drivers). In other cases, the drivers 1634 may provide proprietary or specialized functionality.

The service provider computer(s) or servers may also include additional storage 1622, which may include removable storage and/or non-removable storage. The additional storage 1622 may include magnetic storage, optical disks, solid state disks, flash memory, and/or tape storage. The additional storage 1622 may be housed in the same chassis as the node(s) 1602a-1602h or may be in an external enclosure. The memory 1618 and/or additional storage 1622 and their associated computer-readable media may provide non-volatile storage of computer-readable instructions, data structures, program modules, and other data for the computing devices. In some implementations, the memory 1618 may include multiple different types of memory, such as SRAM, DRAM, or ROM.

The memory 1618 and the additional storage 1622, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1618 and the additional storage 1622 are examples of computer storage media. Additional types of computer storage media that may be present in the node(s) 1602a-1602h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1602a-1602h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1602a-1602h may also include I/O device(s) 1626, such as a keyboard, a mouse, a pen, a voice input device, a touch input device, a display, speakers, a printer, and the like. The node(s) 1602a-1602h may also include one or more communication channels 1636. A communication channel 1636 may provide a medium over which the various components of the node(s) 1602a-1602h can communicate. The communication channel or channels 1636 may take the form of a bus, a ring, a switching fabric, or a network.

The node(s) 1602a-1602h may also contain network device(s) 1624 that allow the node(s) 1602a-1602h to communicate with a stored database, another computing device or server, user terminals and/or other devices on the network(s) 1600.

In some implementations, the network device 1624 is a peripheral device, such as a PCI-based device. In these implementations, the network device 1624 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1624 may be connected to a computing system using a PCIe interface.

A PCI-based device may include one or more functions. A "function" describes operations that may be provided by the network device 1624. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1624 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A distributed neural network training system comprising:
    a plurality of on-chip collective parameter server nodes configured as a network represented as a hyper-rectangle with N-dimensions, wherein each of the on-chip collective parameter server nodes acting as a processing node includes:
        a plurality of neural network processors; and
        an internode communication interface,
    wherein each of the on-chip collective parameter server nodes is configured to:
        perform a first pass of a training process to generate a set of weight gradients;
        perform an intra-node scatter-reduce operation between the plurality of neural network processors of an on-chip collective parameter server node;
        for each of the N-dimensions in a sequence of dimensions, perform an inter-node scatter-reduce operation to:
            transmit a respective portion of the set of weight gradients to each processing node that is on a same edge of a corresponding dimension, wherein a number of portions of the set of weight gradients corresponds to a number of processing nodes on the same edge of the corresponding dimension;
            collect a respective remaining portion of the set of weight gradients from each processing node that is on the same edge of the corresponding dimension; and
            reduce a remaining portion of the set of weight gradients and the respective remaining portions of the set of weight gradients from each processing node on the same edge of the corresponding dimension to generate reduced weight gradients,
            wherein the reduced weight gradients are used as the set of weight gradients to perform the inter-node scatter-reduce operation for a subsequent dimension in the sequence of dimensions;
        for each of the N-dimensions in a reverse order of the sequence of dimensions, perform an inter-node all-gather operation to:
            transmit the reduced weight gradients to each processing node on the same edge of the corresponding dimension; and
            collect respective reduced weight gradients from each processing nodes on the same edge of the dimension to generate updated weight gradients;
        perform an intra-node all-gather operation between the plurality of neural network processors of an on-chip collective parameter server node; and
        perform a second pass of the training process using the updated weight gradients.

2. The distributed neural network training system of claim 1, wherein the sequence of dimensions includes an order of the dimensions to utilize higher bandwidth between the on-chip collective parameter server nodes for earlier dimensions than for later dimensions.

3. The distributed neural network training system of claim 2, wherein the earlier dimensions have fewer on-chip collective parameter server nodes than the later dimensions.

4. The distributed neural network training system of claim 1, wherein a number of on-chip collective parameter server nodes in the distribute neural network training system is equal to a product of N number of prime factors, and wherein each of the N dimensions contains a number of on-chip collective parameter server nodes being equal to a corresponding one of the prime factors.

5. The distributed neural network training system of claim 1, wherein the inter-node scatter-reduce operation is performed in a pipelined manner with the intra-node scatter-reduce operation.

6. The distributed neural network training system of claim 1, wherein an inter-node communication bandwidth is smaller than an inter-node communication bandwidth.

7. A computer-implemented method for distributed training in a system of processing nodes configured as a hyper-rectangle network of N-dimensions, the computer-implemented method comprising:
    performing, by a processing node of the processing nodes, a first pass of a training process of a neural network to compute a set of weight gradients, wherein the processing node includes a plurality of neural network processors;
    performing, by the processing node, an intra-node scatter-reduce operation between the neural network processors of the processing node;
    for each of the N-dimensions that the processing node is part of, performing by the processing node according to a sequence of dimensions:
        an inter-node scatter-reduce operation on the set of weight gradients with processing nodes that are on a same edge of a corresponding dimension to generate reduced weight gradients,
        wherein the reduced weight gradients are used as the set of weight gradients to be operated on for performing the inter-node scatter-reduce operation for a subsequent dimension in the sequence of dimensions;
    for each of the N-dimensions that the processing node is part of, performing by the processing node in a reverse order of the sequence of dimensions:
        an inter-node all-gather operation on the reduced weight gradients with the processing nodes on the same edge of the corresponding dimension to generate updated weight gradients,
        wherein performing the inter-node all-gather operation for a dimension includes transmitting the reduced weight gradients to the processing nodes on the same edge of the dimension, and collecting respective reduced weight gradients from the processing nodes on the same edge of the dimension to generate the updated weight gradients;
    performing an intra-node all-gather operation between the neural network processors of the processing node; and
    performing a second pass of the training process using the updated weight gradients.

8. The computer-implemented method of claim 7, wherein performing the inter-node scatter-reduce operation for a dimension includes:
    splitting the set of weight gradients into P subsets, wherein P equals a number of processing nodes on the same edge of the dimension;
    transmitting a respective subset of the P subsets to each processing node of (P−1) processing nodes on the same edge of the dimension;
    collecting a respective subset, corresponding to a remaining subset of the P subsets, from each of the (P−1) processing nodes on the same edge of the dimension; and
    performing a reduce operation on the remaining subset of the P subsets and the collected respective subsets from the (P−1) processing nodes on the same edge of the dimension to generate the reduced weight gradients.

9. The computer-implemented method of claim 8 wherein transmitting a respective subset of the P subsets includes transmitting a first subset along a slower link to a first processing node before transmitting a second subset along a faster link to a second processing node.

10. The computer-implemented method of claim 8, wherein the inter-node scatter-reduce operation for the corresponding dimension is performed in parallel with other processing nodes of an orthogonal dimension.

11. The computer-implemented method of claim 7, wherein transmitting the reduced weight gradients includes transmitting the reduced weight gradients along a slower link to a first processing node before transmitting the reduced weight gradients along a faster link to a second processing node.

12. The computer-implemented method of claim 7, wherein the inter-node all-gather operation for the corresponding dimension is performed in parallel with other processing nodes of an orthogonal dimension.

13. The computer-implemented method of claim 7, wherein the inter-node scatter-reduce operation is performed on a first dimension having a shorter edge before a second dimension having a longer edge.

14. The computer-implemented method of claim 7, wherein each of the neural network processors is capable of operating as an on-chip collective parameter server node.

15. The computer-implemented method of claim 7, wherein the inter-node scatter-reduce operation is performed in a pipelined manner with the intra-node scatter-reduce operation.

16. The computer-implemented method of claim 7, wherein an inter-node communication bandwidth is smaller than an inter-node communication bandwidth.

17. A non-transitory computer readable medium having stored therein instructions that, when executed by one or more processors of a computing system operating as a processing node in a system of processing nodes configured as a hyper-rectangle network of N-dimensions, cause the computing system to perform a method comprising:
    performing a first pass of a training process of a neural network to compute a set of weight gradients,
    performing an intra-node scatter-reduce operation between neural network processors of the processing node;
    for each of the N-dimensions that the processing node is part of, performing according to a sequence of dimensions:
        an inter-node scatter-reduce operation on the set of weight gradients with processing nodes that are on a same edge of a corresponding dimension to generate reduced weight gradients by:

splitting the set of weight gradients into P subsets, wherein P equals a number of processing nodes on the same edge of the dimension;

transmitting a respective subset of the P subsets to each processing node of (P−1) processing nodes on the same edge of the dimension;

collecting a respective subset, corresponding to a remaining subset of the P subsets, from each of the (P−1) processing nodes on the same edge of the dimension; and performing a reduce operation on the remaining subset of the P subsets and the collected respective subsets from the (P−1) processing nodes on the same edge of the dimension to generate the reduced weight gradients, wherein the reduced weight gradients are used as the set of weight gradients to be operated on for performing the inter-node scatter-reduce operation for a subsequent dimension in the sequence of dimensions;

for each of the N-dimensions that the processing node is part of, performing in a reverse order of the sequence of dimensions:

an inter-node all-gather operation on the reduced weight gradients with the processing nodes on the same edge of the corresponding dimension to generate updated weight gradients;

performing an intra-node all-gather operation between the neural network processors of the processing node; and performing a second pass of the training process using the updated weight gradients.

18. The non-transitory computer readable medium of claim 17, wherein performing the inter-node all-gather operation for a dimension includes:

transmitting the reduced weight gradients to the processing nodes on the same edge of the dimension; and collecting respective reduced weight gradients from the processing nodes on the same edge of the dimension to generate the updated weight gradients.

19. The non-transitory computer readable medium of claim 17, wherein the inter-node scatter-reduce operation is performed in a pipelined manner with the intra-node scatter-reduce operation.

* * * * *